US006091712A

United States Patent [19]
Pope et al.

[11] Patent Number: 6,091,712
[45] Date of Patent: Jul. 18, 2000

[54] METHOD AND APPARATUS FOR STORING AND RETRIEVING PERFORMANCE DATA COLLECTED BY A NETWORK INTERFACE UNIT

[75] Inventors: Kevin T. Pope, Poway; Maynard A. Wright, Citrus Heights; Daniel A. Strich, Encinitas; Paul R. Hartmann; Edward T. Ellebracht, both of Escondido; Douglas B. Ramsayer, San Diego, all of Calif.

[73] Assignee: Applied Digital Access, Inc., Dover, Del.

[21] Appl. No.: 08/773,654

[22] Filed: Dec. 24, 1996

Related U.S. Application Data

[63] Continuation-in-part of application No. 08/713,027, Sep. 12, 1996, which is a continuation of application No. 08/372,819, Dec. 23, 1994, Pat. No. 5,566,161, and a continuation of application No. 08/720,567, Sep. 30, 1996, said application No. 08/372,819, and a continuation-in-part of application No. 08/723,096, Sep. 30, 1996, said application No. 08/372,819, and a continuation-in-part of application No. 08/723,097, Sep. 30, 1996.

[51] Int. Cl.[7] .............................. G08C 15/00; H04J 3/12
[52] U.S. Cl. ........................................... 370/244; 370/522
[58] Field of Search .................................... 370/244, 252, 370/242, 527, 528, 529, 522, 523, 241, 248, 249, 466, 467

[56] References Cited

U.S. PATENT DOCUMENTS

| | | |
|---|---|---|
| 4,566,094 | 1/1986 | Ardon et al. . |
| 4,759,009 | 7/1988 | Casady et al. ........................... 370/242 |
| 4,797,654 | 1/1989 | Young et al. . |
| 4,882,727 | 11/1989 | Williams et al. . |
| 4,890,254 | 12/1989 | Cooley . |
| 4,958,342 | 9/1990 | Williams et al. . |
| 5,010,544 | 4/1991 | Chang et al. ........................... 370/249 |
| 5,063,564 | 11/1991 | Crandall et al. . |
| 5,208,803 | 5/1993 | Conforti et al. . |
| 5,343,461 | 8/1994 | Barton et al. ........................... 370/249 |
| 5,347,576 | 9/1994 | Taylor . |
| 5,453,989 | 9/1995 | Kitayama et al. ...................... 370/522 |
| 5,455,824 | 10/1995 | Okuyama et al. ...................... 370/420 |
| 5,473,665 | 12/1995 | Hall et al. ................................. 379/29 |
| 5,506,843 | 4/1996 | Tanaka .................................... 370/522 |
| 5,513,173 | 4/1996 | Machemer et al. ..................... 370/466 |
| 5,566,162 | 10/1996 | Gruber et al. .......................... 370/248 |
| 5,596,568 | 1/1997 | Fleshren ................................. 370/249 |
| 5,668,800 | 9/1997 | Stevenson .............................. 370/249 |
| 5,768,261 | 6/1998 | Brownmiller et al. ................. 370/242 |

*Primary Examiner*—Chau Nguyen
*Assistant Examiner*—Phuongchau Ba Nguyen
*Attorney, Agent, or Firm*—Heller Ehrman White & McAuliffe

[57] ABSTRACT

A method and apparatus for storing and communicating information regarding the condition of signals which pass through the network interface between customer premises equipment and a local exchange carrier in a telecommunications system. Information stored at the network interface can be sent as a message which is encoded within the payload, within the frame bits, or within the data link. The information that is stored at the network interface is sectionalized to reduce the amount of information that need be sent and to reduce the processing required by the receiving device.

15 Claims, 12 Drawing Sheets

METHOD AND APPARATUS FOR STORING AND RETRIEVING PERFORMANCE DATA COLLECTED BY A NETWORK INTERFACE UNIT

RELATED APPLICATIONS

The present application is a continuation-in-part of U.S. patent application Ser. No. 08/713,027, filed on Sep. 12, 1996, which is a continuation-in-part of U.S. patent application Ser. No. 08/372,819, now U.S. Pat. No. 5,566,161 each of which are assigned to the assignee of the present application, and each of which are incorporated herein by reference.

The present application is also a continuation-in-part of U.S. patent application Ser. No. 08/720,567, filed on Sep. 30, 1996, which is a continuation-in-part of U.S. patent application Ser. No. 08/372,819, each of which are assigned to the assignee of the present application, and each of which are incorporated herein by reference.

The present application is also a continuation-in-part of U.S. patent application Ser. No. 08/723,096, filed on Sep. 30, 1996, which is a continuation-in-part of U.S. patent application Ser. No. 08/372,819, each of which are assigned to the assignee of the present application, and each of which arc incorporated herein by reference.

The present application is also a continuation-in-part of U.S. patent application Ser. No. 08/723,097, filed on Sep. 30, 1996, which is a continuation-in-part of U.S. patent application Ser. No. 08/372,819, each of which are assigned to the assignee of the present application, and each of which are incorporated herein by reference.

BACKGROUND OF THE INVENTION

1. Field of the Invention

This invention relates to telecommunications systems, and more particularly to a method and apparatus for storing and retrieving performance data collected by a network interface unit in a telecommunications system.

2. Description of Related Art

Public Switched Telephone Networks (PSTN) commonly utilize Time Division Multiplexing (TDM) transmission systems to communicate both voice and data signals over a digital communications link. For example DS1 (digital signal level 1) data paths are currently used to carry both voice and data signals over a single transmission facility. DS1 paths carry DS1 signals which are transmitted at a nominal rate of 1.544 Mb/s (e.g., 8,000 frames of 193 bits per second, representing 24 channels of 8 bits plus one overhead bit per frame). DS1 paths reduce the number of lines required to carry voice and data signals by multiplexing the 24 channels on a signal data path. Data paths, such as DS1 paths, have a portion of the data transmission capability assigned to communicating customer information from one end of the data path to the other. This portion of the transmission capability is commonly referred to as the "payload" (i.e., 192 bits of each of the 8000 frames). In addition, another portion of the transmission capability is assigned to overhead functions, such as error detection and maintaining the data path. This portion of the transmission capability is commonly referred to as "overhead" (i.e., the 193rd bit of each of the 8000 frames).

New equipment typically provides users with an option for selecting between one of two commonly used formats; super frame (SF) format and extended super frame (ESF) format. However, most of the equipment currently in use provides only the SF frame format. Network interface units (NIUs) provided by Applied Digital Access have the ability to change the superframe (SF) formatted signal (having only 12 frames) to an extended superframe signal (ESF) having 24 frames.

The principle advantage provided by the use of ESF formatted signals is that a portion of the 8 kb/s (kilobit per second) overhead bits that is dedicated to framing in SF signals are made available for other purposes. That is, in the ESF frame format, the 8 kb/s overhead capacity is divided into three independent channels having capacities as indicated below:

fps (framing): 2 kb/s
CRC (error checking): 2 kb/s
DL (data link): 4 kb/s

The overhead capacity of an ESF formatted DS1 signal therefore is occupied by three separate and distinct signals. A 6 bit fps pattern is repeated once per extended superframe. An extended superframe is equal in length to 24 super frames (i.e., 193 bits×24=4,632). Therefore, one fps bit of the 6 bit pattern occurs each 772 bits. A 6 bit CRC is also repeated once per extended superframe. Three types of patterns carried by the DL are as follows:

HDLC flags (idle code): 8 bits in length
unscheduled message: 16 bits in length
scheduled message: 104 bits in length The DS1 path 30 includes hardware used by the network providers to transmit DS1 digital signals between equipment controlled by different data users. The DS1 path 30 as shown in FIG. 1 is implemented by a T1 line. However, other facilities, such as coaxial cables, fiber optic cables, and microwave links may be used by providing an appropriate transport interface between the Channel Service Unit (CSU) 20 and the facility.

DS1 signals may be transmitted over a dedicated point-to-point network as simple as the one shown in FIG. 1 utilizing twisted wire pairs and repeaters spaced at intermediate points. Alternatively, the network may be as complex as the one shown in FIG. 2 which utilizes a combination of twisted wire pairs and repeaters, multiplexers, Digital Cross-connect Systems (DCS), Add Drop Multiplexers (ADM), Fiber Optic Terminals (FOT), Coaxial Cable, Microwave, Satellite, or any other transmission media capable of transporting a DS1 signal. In some instances, DS1 signals may be carried over a network similar to the point-to-point network, but having the added capability to switch the DS1 signal (in a DCS or ADM) in a manner similar to the PSTN.

While DS1 transmission systems such as the system shown in FIG. 1 are well-known, customers more typically communicate using a public DS1 network, as shown in FIG. 2. In the DS1 transmission system shown in FIG. based on the location of the equipment. Essentially, the equipment is broken into three categories: (1) the Customer Premises Equipment (CPE) 40; (2) the Local Exchange Carrier (LEC) equipment, which comprises the local loop 42 and the central office equipment; and (3) the InterExchange Carrier (IEC) 52. CPE 40 belongs to the network user (or customer). The customer that owns the CPE 40 is responsible for both its operation and maintenance. The customer must ensure that its equipment provides a healthy and standard DS1 digital signal to the local exchange carrier equipment 42. The equipment 40 on the customer premises typically consists of DS1 multiplexers, digital Private Branch Exchanges (PBXs), and any other DS1 terminating equipment which connects to a CSU 20 at the CPE site. The local exchange carrier equipment 42 connects the CPE 40 with the central office 44 and the IEC 52. LECs assume responsibility for maintaining equipment at the line of demarcation between the CPE 40 and the local loop 42.

As shown in FIG. 2, an NIU 50 may be coupled between the CPE 40 and the LEC equipment 42. The NIU 50 represents the point of demarcation between the CPE 40 and the LEC equipment 42 (which comprises local loop equipment 42, and Central Office (CO) equipment 44). Prior art NIUs may be relatively simple devices which allow network technicians to minimally test the operation and performance of both the CPE 40 and the DS1 network 52 or they may be more sophisticated devices.

Independent of whether the DS1 transmission system is simple (FIG. 1), complex (FIG. 2), or switched, all the circuits and network equipment required to transmit a DS1 signal must be tested and maintained to operate at maximum efficiency. Currently, when a problem is reported on a DS1 path, one method for sectionalizing the path requires sending a technician to several points along the path to collect data. The collected data is then reviewed by the technician in an attempt to determine the point of origin of a problem. Since the equipment that makes up the path is physically distributed over a large geographic region (equipment at one end of the path may be thousands of miles from equipment at the other end of the path) it is typical for several technicians to become involved in the sectionalization of the path. Each technician must be highly skilled and trained in order to collect the data from the various points along the path.

In many cases the responsibility for sectionalizing the DS 1 path must be shared by the LEC, IEC, and customer, since each party is responsible for maintaining a portion of the equipment that makes up the path. Accordingly, each party incurs an expense when equipment maintained by any of the other parties experiences a problem.

In some cases, the revenue bearing signals being transmitted over the path must be disrupted in order to perform tests which generate data to be collected by a technician. Such "out-of-service testing" causes "live" traffic to be removed from the DS1 link before testing commences. In out-of-service testing, a test instrument transmits a specific data pattern to a receiving test instrument that anticipates the sequence of the pattern being sent. Any deviation from the anticipated pattern is counted as an error by the receiving test instrument. Out-of-service testing can be conducted on a "point-to-point" basis (i.e., by sending a test pattern from a first location to a second location) or by creating a "loop-back" (i.e., sending a test pattern from a first location, and requesting that a device along the signal path loop that test pattern back over the return path to the first location). Point-to-point testing requires two test instruments (a first instrument at one end of the DS1 transmission system, and a second instrument at the other end of the DS1 transmission system). By simultaneously generating a test data pattern and analyzing the received data for errors, the test instruments can analyze the performance of a DS1 link in both directions.

Loop-back testing is often used as a "quick check" of circuit perfonnance or when attempting to isolate faulty equipment. In loop-back testing, a single test instrument sends a "loop-up" code to a loop back device, such as the CSU at the far end, before data is actually transmitted. The loop-up code causes all transmitted data to be looped back by the CSU in the direction toward the test instrument. By analyzing the received data for errors, the test instrument measures the performance of the link up to and including the far end CSU. Because loop-back testing only requires a single test instrument, and thus, only one operator, it is a convenient testing means.

Both point-to-point and loop-back tests allow detailed measurements of any DS1 transmission system. However, because both testing methods require that live, revenue-generating traffic be interrupted, they are undesirable. Thus, out-of-service testing is inherently expensive and undesirable. It is therefore desirable to perform in-service monitoring of "live" data to measure the performance and viability of DS1 transmission systems. Because in-service monitoring does not disrupt the transmission of live, revenue-generating traffic, it is suitable for routine maintenance and it is preferred by both the LECs and their customers.

Equipment 44 within the central office may be capable of monitoring for various DS1 signal requirements to reduce the amount of effort required by technicians. In addition, equipment within the DS1 path provides maintenance and alarm signals indicative of particular conditions on the incoming and outgoing signals. These signals are defined by standards established by the American National Standards Institute for operation of DS1 communications links (ANSI T1.403-1995 and ANSI T1.408, et. al, each of which are herein incorporated by reference). These signals include (1) RAI, which indicates that the signal that was received by the CPE equipment from the NIU 50 was lost (the detailed requirements for sending RAI are contained in ANSI T1.231, which is herein incorporated by reference); and (2) AIS, which is an unframed, all-ones signal which is transmitted to the network interface upon loss, or in response to the presence of a signal defect of the originating signal (the signal received from the network), or when any action is taken that would cause a service disruption (such as loopback). In addition, detection of signal defects in the digital hierarchy above DS1 causes an AIS signal to be generated. The AIS signal is removed when the condition that triggered the AIS is terminated.

In addition to these indications ANSI T1.403 defines a performance report message (PRM) which is sent each second using a format which is detailed in the ANSI standard. PRMs contain performance information within a "message field" portion of the PRM. The performance information indicates the performance of the circuit in each of four previous one-second intervals. For example, counts of cyclic redundancy checking (CRC) errors are accumulated in each contiguous one-second interval by the reporting equipment. In accordance with the ANSI standard, one bit (designated "G1" by the ANSI standard) within the variable portion of the PRM indicates that one CRC error had occurred within the last second of transmission. At the end of each one-second interval, a modulo-4 counter within the variable portion of the PRM is incremented, and the appropriate performance bits are set within the remainder of the variable portion of the report in accordance with the PRM format provided in the specification. Other bits indicate that: (1) between 2 and 5 CRC events had occurred; (2) between 6 and 10 CRC events had occurred; (3) between 11 and 100 CRC events had occurred; (4) between 101 and 319 CRC events had occurred; (5) greater than 319 CRC events had occurred; (6) at least one severely errored framing event had occurred; (7) at least one frame synchronization bit error event had occurred; (8) at least one line code violation event had occurred; and (9) at least one slip event had occurred. The number and type of Events indicates the quality of transmission. Each Event is defined within ANSI T1.403. Performance reports may be also be generated and transmitted in accordance with AT&T PUB 54016 Performance Reporting, which is herein incorporated by reference.

The use of PRMs reduces the effort required of technicians, since performance information is collected and reported without the need to dispatch a technician. In addition, the information is collected and reported non-intrusively in real-time. PRMs provide information that can be used in "Sectionalization" of the DS1 path. Sectionalization is a process by which several sections (or "legs") of a data path are analyzed to determine in which leg a communication problem originates. In particular, for the purposes of this discussion, sectionalization refers to determining whether a problem in the DS1 path originates within the CPE equipment 40 (for which the customer is responsible), or in the network (i.e., the LEC equipment 42, 44, for which the local exchange carrier is responsible, or the T1 network equipment 52, for which the Interexchange Carrier (IEC) is responsible). However, since PRMs are transmitted in the DL channel (which only exists for ESF formatted DS1 channels), only equipment that conforms to the ESF format described in ANSI T1.403 can transmit PRMs.

An NIU (referred to as a Remote Module) described in U.S. Pat. No. 5,566,161, which is assigned to Applied Digital Access, Inc. of San Diego, Calif. provides a means by which SF formatted signals received from the CPE can be converted into ESF formatted signals and ESF formatted signals received from the network can be reformatted back into SF signals before transmission to the CPE at the other end of the data path. The Remote Module also provides additional information which can used to aid in sectionalization, as described in U.S. patent application Ser. No. 08/713,027. In addition T3AS test and performance monitor equipment, described in U.S. Pat. No. 5,495,470 entitled "Alarm Correlation System for a TelephoneNetwork" and U.S. Pat. No. 5,500,853 entitled "Relative Synchronization System for a Telephone Network", each assigned to the assignee of the present application and each incorporated herein by this reference analyzes the information provided by PRMs, and additional information that is made available by a Remote Module located at the network interface to sectionalize problems non-intrusively, in real-time, without the need to dispatch a technician regardless of whether the CPF is using ESF format.

However, under the following conditions in which a NIU capable of storing information regarding the performance of the circuit is present at one network interface, such non-intrusive, real-time sectionalization is not possible: (1) the circuit has a T3AS or other such equipment capable of interpreting the information that can be provided by a Remote Module or other NIU, but at least one network interface lacks an NIU capable of performing frame format conversion; (2) the circuit does not have a T3AS or other equipment which is capable of utilizing the information that is provided within the PRMs and/or which is output by the Remote Modules at the network interface at each end of the circuit; and (3) both a T3AS and at least one NIU capable of performing frame format conversion are lacking.

Under each of these three conditions, in order to determine where trouble on the circuit has originated, information must be retrieved from the network interface. Under the first of these three conditions, if one NIU capable of providing information regarding the performance of the circuit over an ESF DL is present, and the circuit is using ESF format, then information can be retrieved with regard to that portion of the circuit between the T3AS and the NIU over the ESF DL, as described in U.S. Pat. No. 5,495,470 entitled "Alarm Correlation System for a Telephone Network" and U.S. Pat. No. 5,500,853 entitled "Relative Synchronization System for a Telephone Network", each assigned to the assignee of the present application and each being incorporated herein by this reference. However, if the circuit is not using ESF format, then prior art intrusive methods for retrieving the information stored within the NIU must be used.

Under either the second or third of these three conditions, even through information regarding the performance of the circuit at the network interface may be available from each NIU to equipment specially designed to receive such information, if no such specially designed equipment is present to decode the information, the information cannot be utilized without using prior art intrusive methods for retrieving the information from each NIU.

Referring again to FIG. 2, there are several types of NIUs 50 currently in use which store information for later retrieval. One of the most popular types of NIUs 50 is the "Smart Jack" available from Westell, Inc., located in Oakbrook, Ill. The Smart Jack NIUJ with Performance Monitoring (PM) allows the ILECs to determine what errors are received and generated by the CPE 40. The Smart Jack NIU accumulates PM data and stores the data in a local buffer for later retrieval by LEC personnel. However, data retrieval in most areas requires that a circuit be taken completely out-of-service and that the NIU be commanded intrusively using a proprietary command set. Furthermore, the Smart Jack NIU disadvantageously provides no practical method for the LECs to retrieve the performance monitor data collected by the Smart Jack NIU. While the Smart Jack NIU does allow non-intrusive transmission of PM data from the Smart Jack to the central office, a paralleling maintenance line must be provided. Most DS1 installations to customer premises, however, do not provide such maintenance lines.

Other NIUs 50 are available from Wescom Integrated Network Systems (WINS), the Larus Corporation, and Teltrend, Inc. All of the prior art NIUs 50 suffer the disadvantages associated with out-of-service monitoring and testing. Therefore, there is a need for an improved NIU 50 which provides non-intrusive maintenance performance monitoring at the point of demarcation between the CPE 40 and the LEC equipment.

In addition to being unable to provide non-intrusive retrieval of information collected during real-time monitoring of DS1 digital equipment, the prior art NIUs 50 a desirable indication of a loss of signal (LOS) caused by the CPE 40 which is distinguishable from LOSs that are caused by failure of the network equipment. Currently, LOS caused by the CPE 40 generates alarms in the LEC central office equipment 44 which are indistinguishable from the alarms generated in response to LOSs caused by equipment failures in the local loop 42, Central Office 44, or DS1 network 52. Therefore, there is a need for an improved NIU which allows the LECs to distinguish LOS alarm signals caused by loss of signal within the CPE 40 from alarms which originate due to loss of signal within the LEC or network. With such an improved NIU, the LECs can then decide whether to notify their customers of the LOS indication or to ignore the indication as they deem appropriate.

Furthermore, unless there is a reason to suspect a problem on a particular data path, the data is not requested. In addition, in prior art data paths in which data is collected and transmitted at regular intervals (such as by PRMs generated by a CSU) this data is not collected at the network interface and therefore the ability to sectionalize the data path does not correlate with the portions of the data path which different organizations are responsible for maintaining.

Therefore there is a need for an improved NIU which allows telephone companies to monitor the performance of a DS1 circuit at the network interface and to recover the performance monitoring data non-intrusively even on circuits that are limited to using SF frame format.

Accordingly, it would be desirable to provide a system which sectionalizes a DS1 path to allow each of the parties responsible for maintaining equipment along the path to determine which party is responsible for the problem. Furthermore it would be desirable to reduce the cost of sectionalizing a DS1 path by determining the location of the origin of the problem without sending a highly skilled technician to a plurality of locations along the path.

SUMMARY OF THE INVENTION

The present invention is a method and apparatus for storing and retrieving information collected at a network interface. In the preferred embodiment, the information is stored in and retrieved from an improved network interface unit (hereinafter referred to as the "Remote Module"). The Remote Module is preferably used for non-intrusively monitoring and storing information regarding alarm conditions and performance parameters of DS1 telephone circuits. The Remote Module is preferably installed on the network side of an "network interface" which exists between customer premises equipment (CPF) and equipment provided by the network provider. The Remote Module enables a network service provider to recover information gathered at the network interface, including information regarding whether a detected alarm or error was caused by a failure of equipment on the CPE side of the network interface or on the network side (i.e., in which leg of the circuit an event occurred).

In accordance with one embodiment of the present invention, the Remote Module allows an Operations System (OS) to query the Remote Module non-intrusively with respect to the customer payload, and receive back information indicating in which leg of the circuit errors or an alarm condition originated non-intrusively with respect to the customer payload. In accordance with such an embodiment, the query is encoded within the frame bits of a superframe (SF) or extended superframe (ESF) transmission. Alternatively, if the circuit is operating in ESF format, the query is transmitted in the data link (sometimes referred to as the facilities data link). In yet another embodiment of the present invention, the query can be encoded as selected logic inversions within a known pattern in the payload of an ESF or SF frame (which can be detected by conventional network equipment as errors in the payload). In accordance with yet another embodiment of the present invention, the query is sent as a non-cyclic pattern which is repeated a number of times over a predetermined period of time.

Information that is collected in the Remote Module may be downloaded in one of a number of ways. In accordance with one embodiment of the present invention, the information can be downloaded by encoding the information in the frame bits of the ESF or SF frames, encoding the information as logic inversions within a known pattern in the payload of an ESF or SF frame, or within the data link of an ESF circuit. In accordance with one embodiment of the present invention, the particular method for transmitting both a query and for downloading the response to a query is selectable from among these three options.

In addition, the present invention is a method and apparatus for determining where the error or alarm condition occurred (i.e., sectionalizing the circuit at the network interface), a method and apparatus for encoding information which allows such information to be transmitted back to an OS in a concise format, and a method and apparatus for communicating the time at which an Event occurred.

Sectionalization is performed by correlating all of the information that is available at the network interface. For example, if no alarm or error exists on the leg of the circuit between the network and the Remote Module, and an RAI signal is detected on the leg between the CPE and the Remote Module, then the Sectionalizer within the Remote Module determines that the alarm condition originated on the leg between the Remote Module and the CPE.

When information is to be downloaded from the Remote Module in response to a query from a network element, the Remote Module determines whether an Event has been detected less than a predetermined amount of time ago, (e.g., within the most recent 8 hours). If so, then a time stamp is associated with the Event which determines the amount of time that has elapsed between the occurrence of the Event and the transmission of the response to the query with a relatively fine resolution (e.g., the time the Event occurred is determined with 15 minute accuracy). However, if the Event occurred more than the predetermined amount of time ago, (e.g., more than 8 hours ago), then the resolution is coarser (e.g., the time the Event occurred is indicated with 24 hour accuracy). Thus, the time at which recent Events occurred can be communicated with relatively high degree of accuracy in a minimum number of bits. Determining the value of the time stamp relative to the time at which the message is transmitted from the Remote Module eliminates the need to synchronize a clock within the Remote Module with a clock within the network element that is requesting the information. In accordance with one embodiment of the present invention, the time stamp is recorded with 1 minute accuracy, but may be reported with less accuracy (lower resolution) in order to reduce the amount of information that is reported by the Remote Module.

The details of the preferred embodiment of the present invention are set forth in the accompanying drawings and the description below. Once the details of the invention are known numerous additional innovations and changes will become obvious to one skilled in the art.

BRIEF DESCRIPTION OF THE DRAWING

The objects advantages, and features of this invention will become readily apparent in view of the following description when read in conjunction with the accompanying drawing, in which.

Like reference and designations in the various drawings refer to like elements.

DETAILED DESCRIPTION OF THE INVENTION

Throughout this description, the preferred embodiment and examples shown should be considered as exemplars, rather than limitations on the present invention.

Overview

The present invention is a system in which a network element, such as a network interface unit (hereinafter referred to as a "Remote Module") is either used alone, combined with a test and performance monitoring device, or combined with another Remote Module to provide a means to determine the origin of "Events" which occur (i.e., to sectionalize a data path). The Remote Module is preferably located at the point of demarcation between the customer premises equipment (CPE) and a network (i.e., such as the network provided by a local exchange carrier and intermediate exchange carrier). This point is hereafter referred to as the network interface. However, it would be within the scope of the present invention to locate a Remote Module anywhere within a circuit in order to provide the ability to report information regarding the condition of signals being received at that location. For example, it may prove advantageous to install a Remote Module at the interface between the local loop and the central office.

Figure 1:
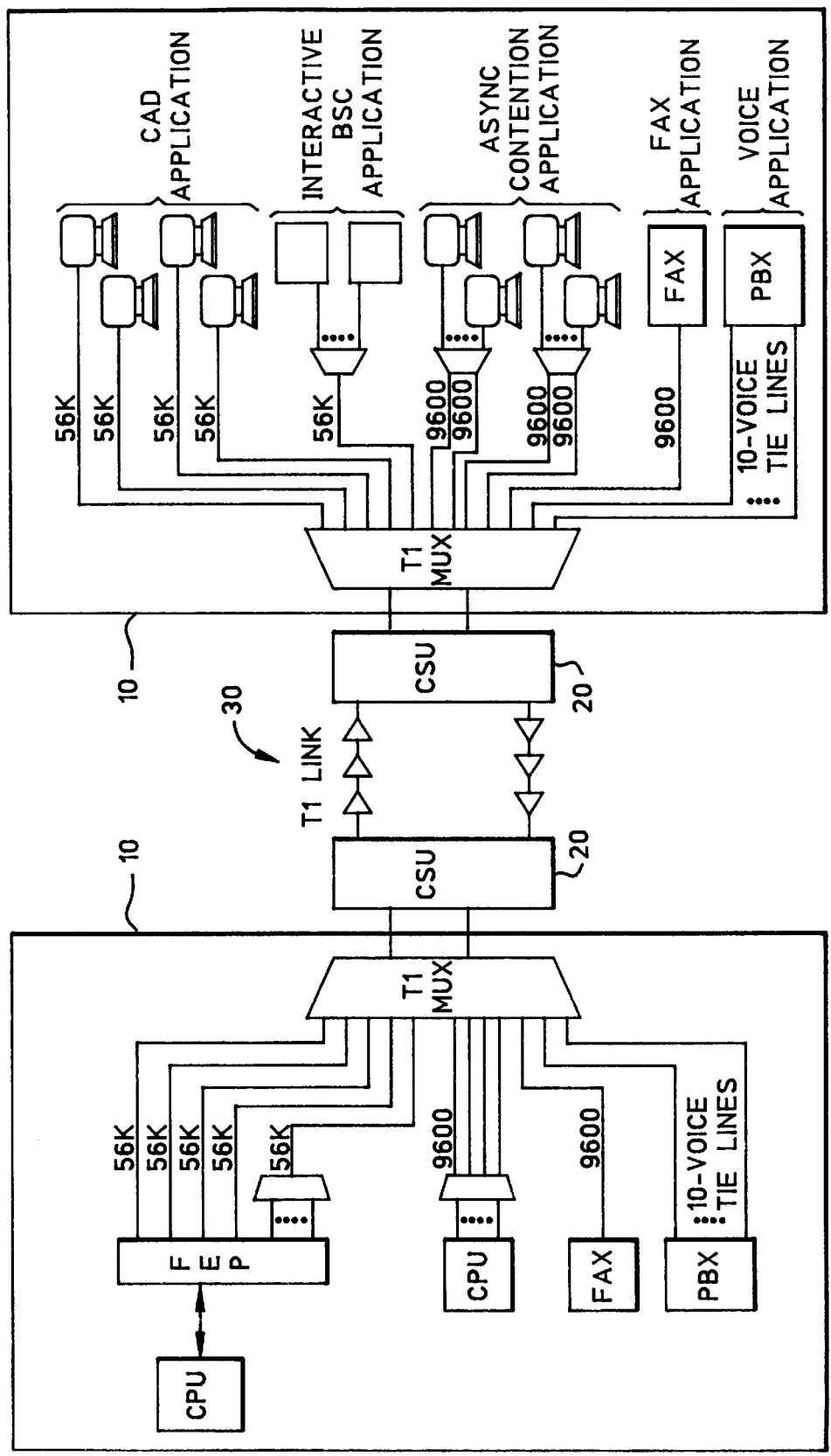
FIG. 1 is a block diagram of a relatively simple private DS1 digital communications network.
Figure 2A:
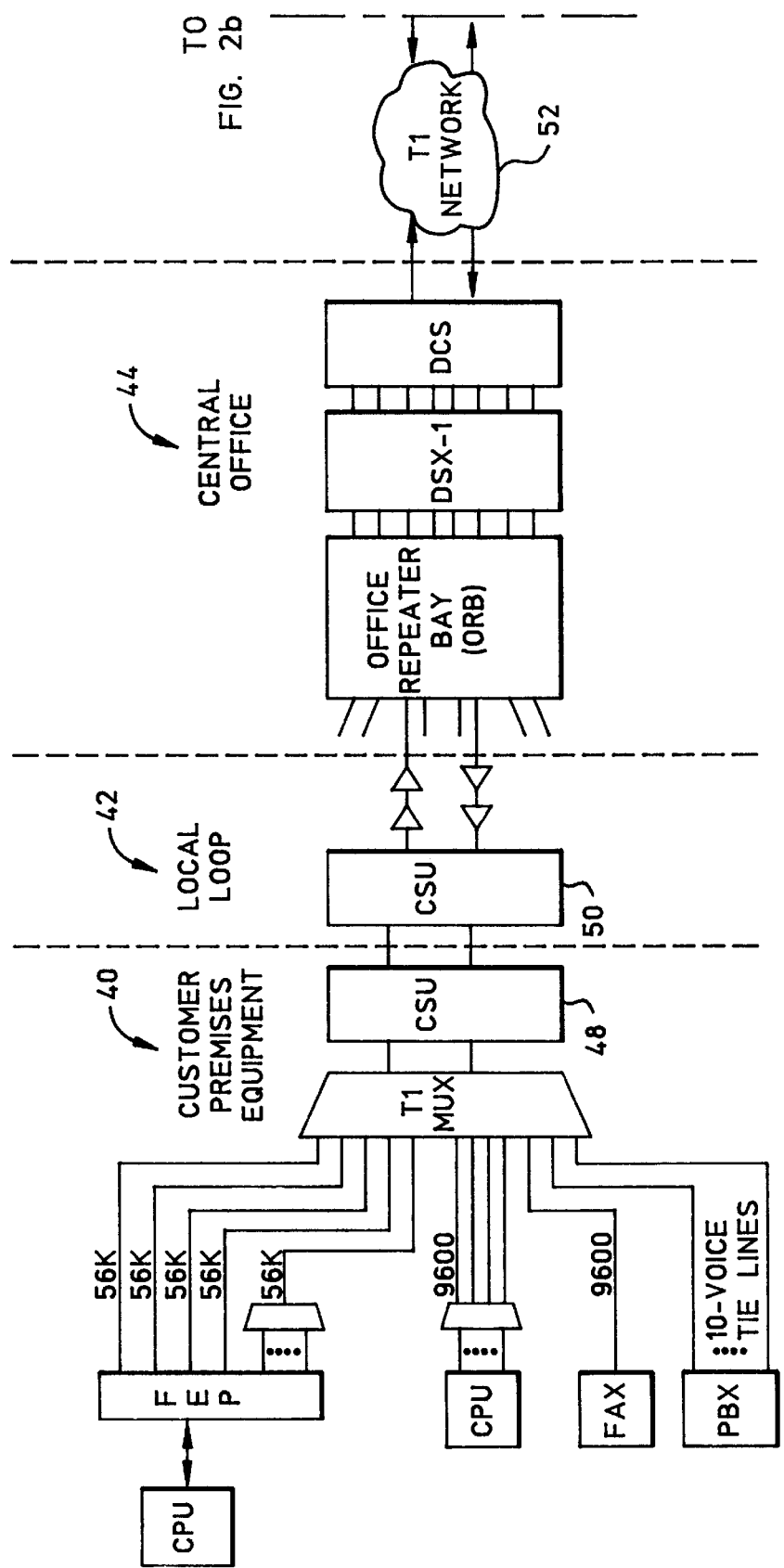
FIG. 2 comprises FIG. 2a and FIG. 2b, and is a block diagram of a complex public DS1 communications network.
Figure 2B:
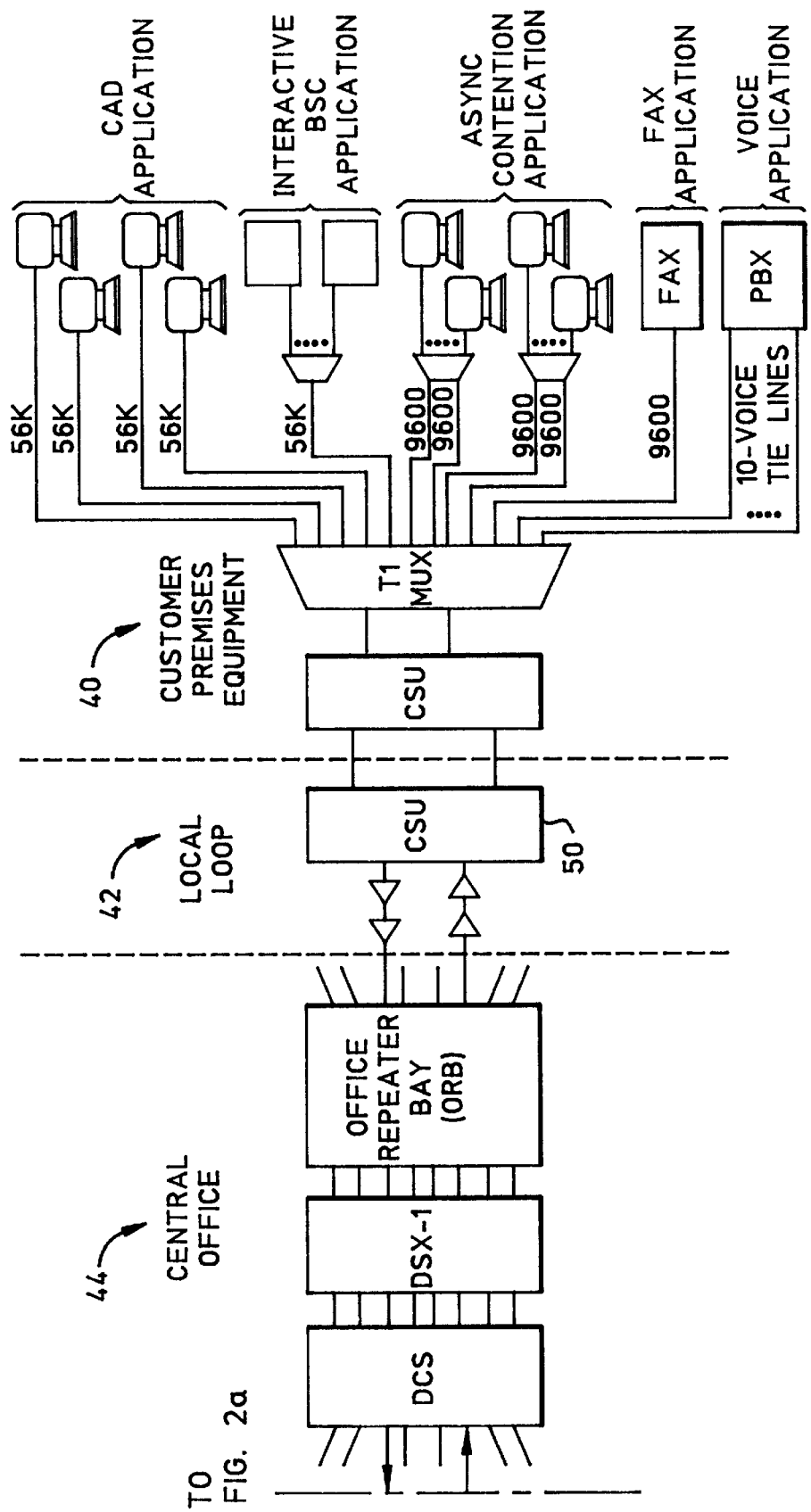
Figure 3A:
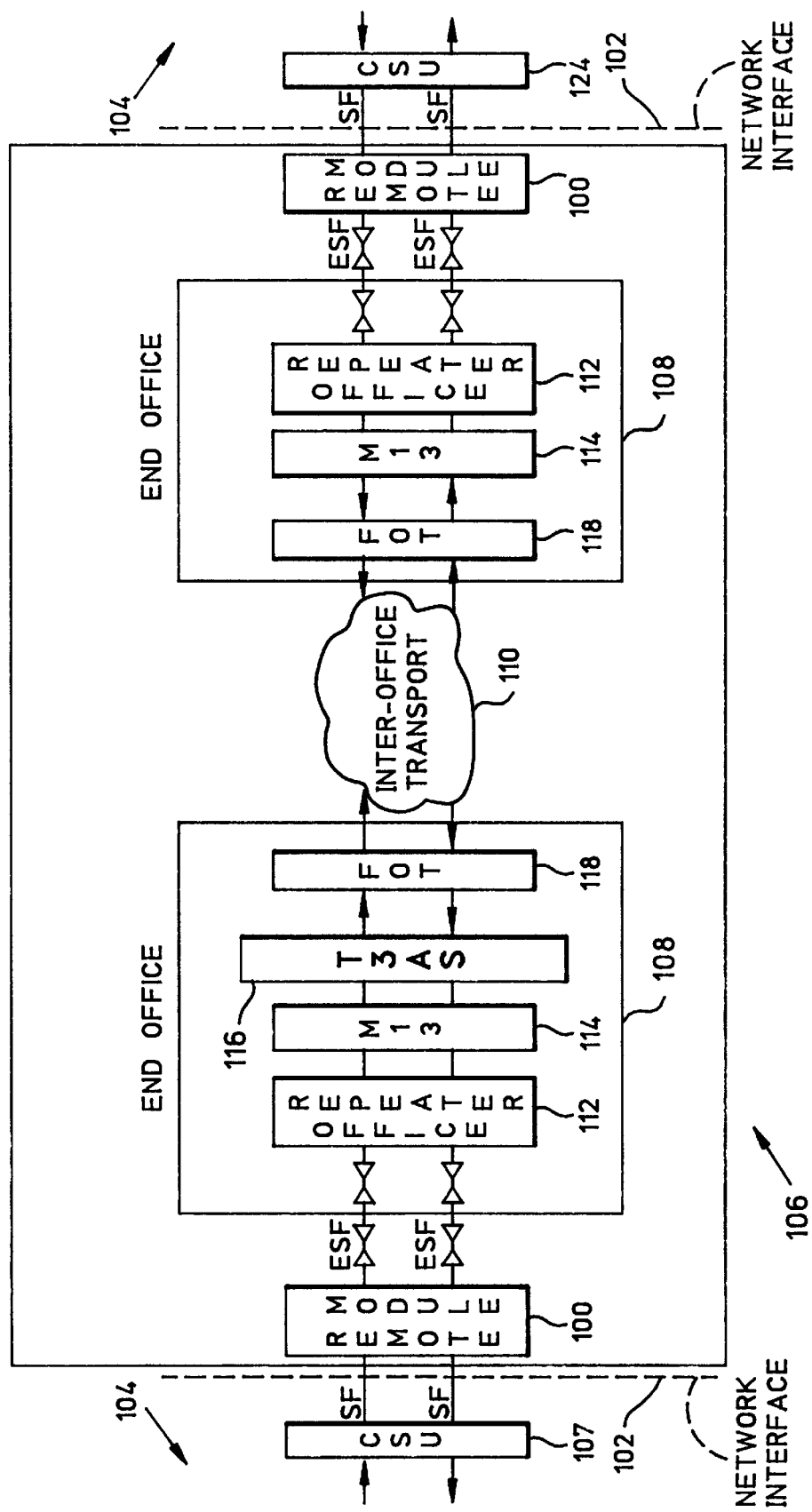
FIG. 3a is a block diagram of a public DS1 path employing the Remote Module of the present invention.
Figure 3B:
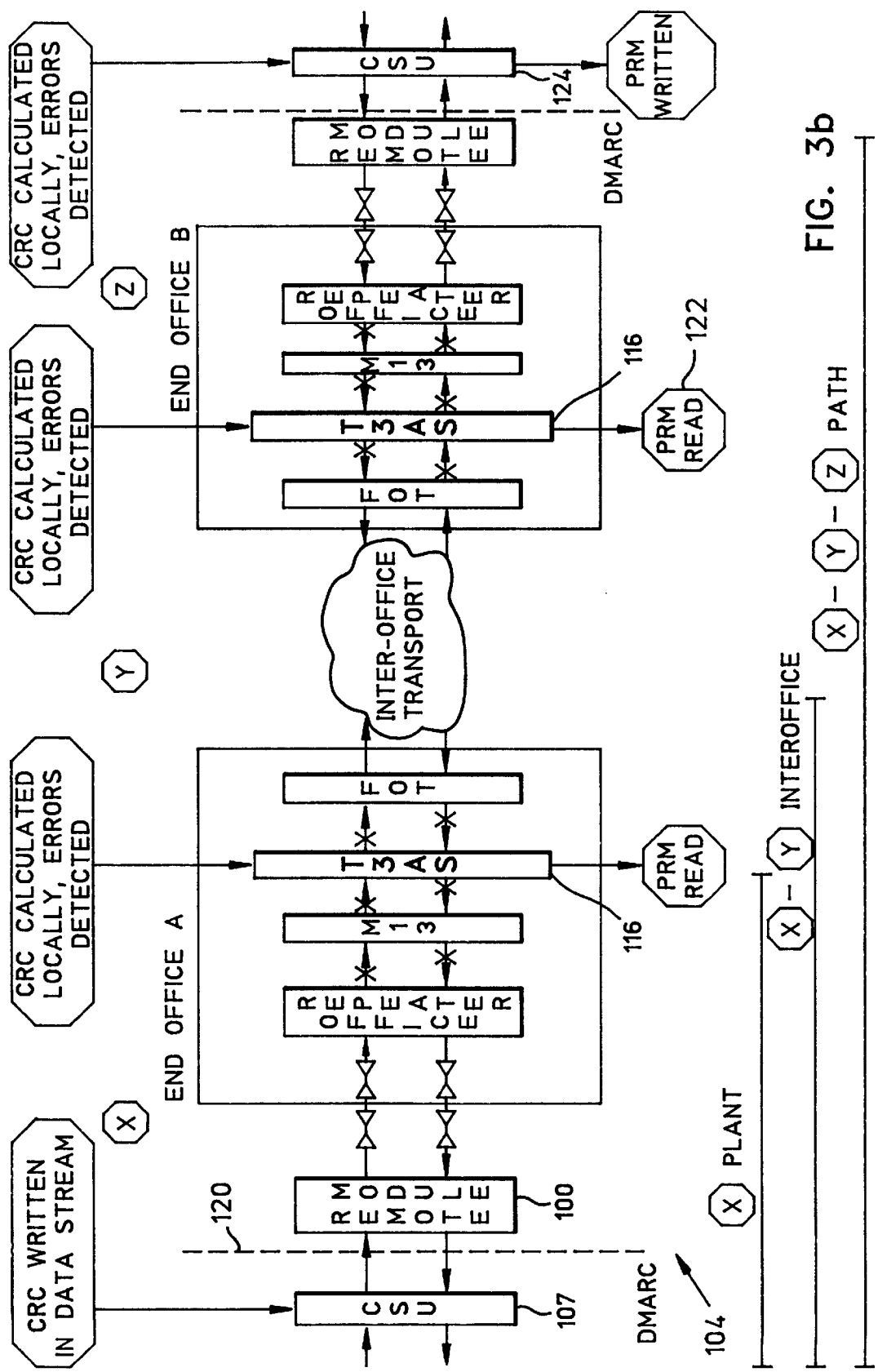
FIG. 3b shows how the present invention is used in a public DS1 path to enhance the sectionalization capability of existing DS1 networks.
Figure 3C:
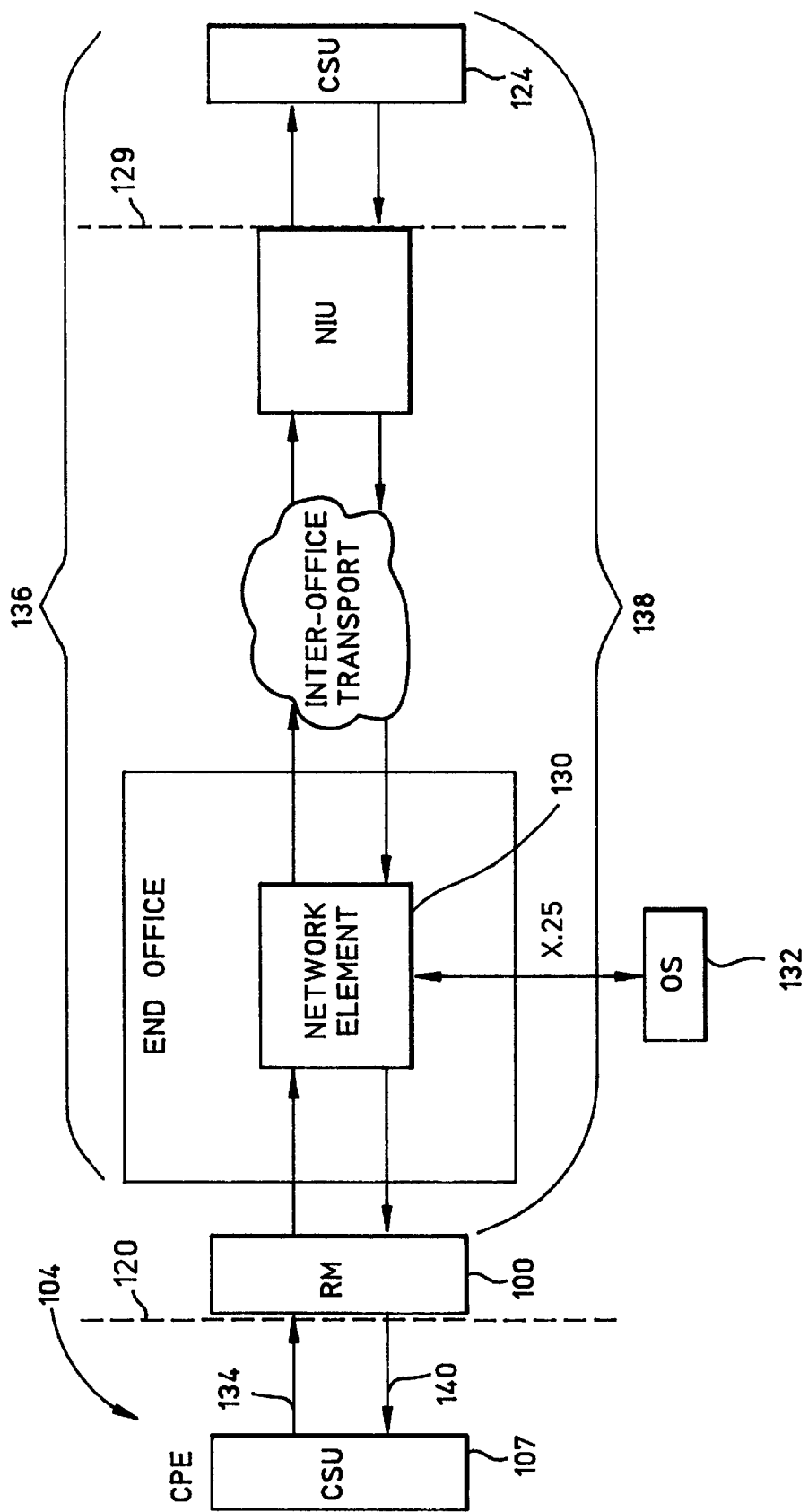
FIG. 3c illustrates a circuit which includes only one Remote Module in accordance with the present invention located at the network interface and no test and performance monitoring device capable of assisting the sectionalization.

FIG. 3c illustrates a circuit which includes only one Remote Module 100 located at the network interface 120 and no test and performance monitoring device capable of assisting the sectionalization. A network element 130 provides a means for communicating with an Operations System (OS) 132. The OS preferably provides central intelligence for monitoring and troubleshooting a plurality of the circuits. The OS is typically manned by technicians who have the ability to make requests for information that will aid them in diagnosing troubles on the system. In the case of an Remote Module 100 used in the circuit shown in FIG. 3c, the Remote Module 100 is capable of storing and, upon command, downloading the stored information that is taken directly from an analysis of the incoming signals received by the Remote Module 100 from a near end channel service unit (CSU) 107 and from a far end CSU 124 through the network. For the purpose of this discussion, the near end CSU 107 is located within the customer premises equipment (CPE) 104 to which the Remote Module 100 is directly connected. The far end CSU 124 is coupled to the Remote Module 100 via the network.

In a circuit in which superframe (SF) frame formatting is used, information is also provided from the CPE at each end of the circuit to indicate whether an alarm condition exists on the signal received by that CPE from the CPE at the other end of the circuit. For the purpose of this discussion, alarms are defined as Events which degrade the quality of the circuit such that the circuit is unusable. The Remote Module 100 can detect, store, sectionalize, and report on alarm conditions to indicate which portion of the circuit (which "leg") is in alarm condition. In the case of the circuit shown in FIG. 3c, sectionalization of alarms can be performed to divide the circuit into four legs: (1) a first leg 134 between the near end CSU 107 and the Remote Module 100 (2) a second leg 136 between the Remote Module 100 and the far end CSU 124, and (3) a third leg 138 between the far end CSU 124 and the Remote Module 100; and (4) a fourth leg 140 between the Remote Module 100 and the near end CSU 107. However, information regarding errors can only be attained on the two legs 134, 138 on which signals are received directly by the Remote Module 100. Errors that occur on legs 136 and 140 cannot be detected or reported by the Remote Module 100 if the circuit is operating using SF frame formatting. For the purpose of this discussion, errors are defined as Events which degrade the quality of the circuit, but which do not make the circuit unusable.

Reporting can be performed in response to a query by the OS either directly to the Remote Module 100 over a communications link, or through the network element 130. Alternatively, a query can be generated by test equipment directly connected to the Remote Module 100 or connected to the Remote Module 100 via a communications link, such as over a telephone line via modem. A query that is transmitted to the Remote Module 100 through the network element 130 can be generated and transmitted to the Remote Module 100 in one of the following ways. The Remote Module 100 is capable of detecting and counting the number of frame bit errors (FBEs) that occur on the signal received on leg 135. Therefore, if a network element 130 is present which is (1) coupled to the OS by a communications link, such as an X.25 or RS-232 communications link, and which is (2) capable of injecting a predetermined number of frame bit errors on the signal that is transmitted over leg 138 to the Remote Module 100, then the network element 130 can request the Remote Module 100 to download information by selectively introducing errors in the frame bits on leg 138. When the Remote Module 100 receives the signal on leg 138, the Remote Module 100 detects the FBEs and decodes the message sent by the network element 130. One particular method for encoding information using FBEs will be presented below in greater detail.

In response, the Remote Module 100 can download the stored information regarding the condition of the legs (i.e., sectionalization information as to which legs are in alarm condition and which legs have errors). In accordance with one embodiment of the present invention, the information that is downloaded includes a first series of bits that indicate the time at which an alarm or error that is being reported was detected. The time is indicated relative to the time that the report is sent. In the preferred embodiment, the time can be indicated with either a 15 minute resolution for the most recent period of time, or one hour resolution for the a longer period. For example, in accordance with one embodiment, the time stamp is communicated using 7 bits, one of which indicates whether the resolution is to be in minute periods or 1 hour periods. Therefore, the most recent 16 hours is reported with 15 minute resolution. In addition, the most recent 64 hours are reported with one hour resolution. In one embodiment an additional 3 bits indicates which of six legs of the circuit have an Event reported. Once additional bit indicates whether the Event is an alarm or an error. By using a time stamp that is determined relative to the time the message is sent, there is no need to synchronize a real-time clock within the Remote Module 100 with a real-time clock within the device to which the Remote Module 100 is reporting. In order to determine when the Event occurred with respect to the real-time clock within the device to which the Remote Module 100 reports. It should be understood that the number of bits used to convey the time stamp and the presence of errors and alarms is implementation dependent. Accordingly, a number of protocols can be used to report the information that is stored within the Remote Module 100.

The download can be performed by encoding the information in the FBEs in a manner similar to the manner in which the network element 130 encodes the request to download. That is, the Remote Module 100 can selectively error frame bits within the signal to be transmitted from the Remote Module 100 to the network element 130 over leg 136. Alternatively, the Remote Module 100 can encode the information to be downloaded within the payload of the signal to be transmitted on leg 135 by selectively introducing errors within the payload of the signal transmitted from the Remote Module 100 to the network element 130. Since errors in the payload cannot typically be counted unless the pattern being sent is known, the Remote Module 100 preferably responds to the request to download information in the payload by transmitting a known pattern in the payload, such as an all ones signal. Errors are introduced by the Remote Module 100 into this known pattern to encode the information to be downloaded.

It will be understood by those skilled in the art that transmitting information in the payload will disrupt customer traffic which would normally flow from the near end CSU 107 to the far end CSU 124. However, customer traffic which flows from the far end CSU 107 to the near end CSU 124 is uninterrupted. Furthermore, if the request from the network element 130 and the download from the Remote Module 100 are transmitted within the FBEs, then the customer payload is uninterrupted in both directions. In accordance with the preferred embodiment of the present invention, the Remote Module 100 has the ability to select whether the information to be downloaded is to be encoded in the payload or in the FBE. The preferable manner is to encode the information to be downloaded in the FBEs.

It is important to note that many circuits have a network element 130 that is capable of detecting errors in the FBE and reporting the number of errors to the OS in response to a command from the OS. Therefore, there is no need to modify the network element 130. That is, the network element need not interpret the FBEs, but need only count the number of FBEs and transmit this information over the communications link to the OS. A relatively simple script can be written in the OS 132 which allows the OS to decode the information transmitted by the Remote Module 100 in the FBEs.

However, some network elements are incapable of counting the number of FBEs that occur within a predetermined time interval, making them incapable of providing the OS 132 with sufficient information to decode the downloaded information. However, almost all circuits have a network element that is in communication with the OS 132 and that is capable of requesting a known pattern to be received and then counting the number of errors that occur in that known pattern.

If both CSUs 107, 124 are generating extended superframe (ESF) performance report messages (PRMs), then the Remote Module 100 can additionally detect, store, sectionalize, and report errors which originate on leg 134, leg 136, leg 138 and leg 140. However, errors that originate on leg 136 cannot be detected unless PRMs are also being generated by a network element on leg 138, such as the far end CSU 124, a far end Remote Module 100, or a test and performance monitoring device. Furthermore, in addition the query and download options that were discussed above, if ESF signals are used on the circuit, then both the query to the Remote Module 100 and the download of information from the Remote Module 100 can be transmitted within the data link channel of the ESF circuit without disrupting the service provided to the customer on the circuit.

Figure 3D:
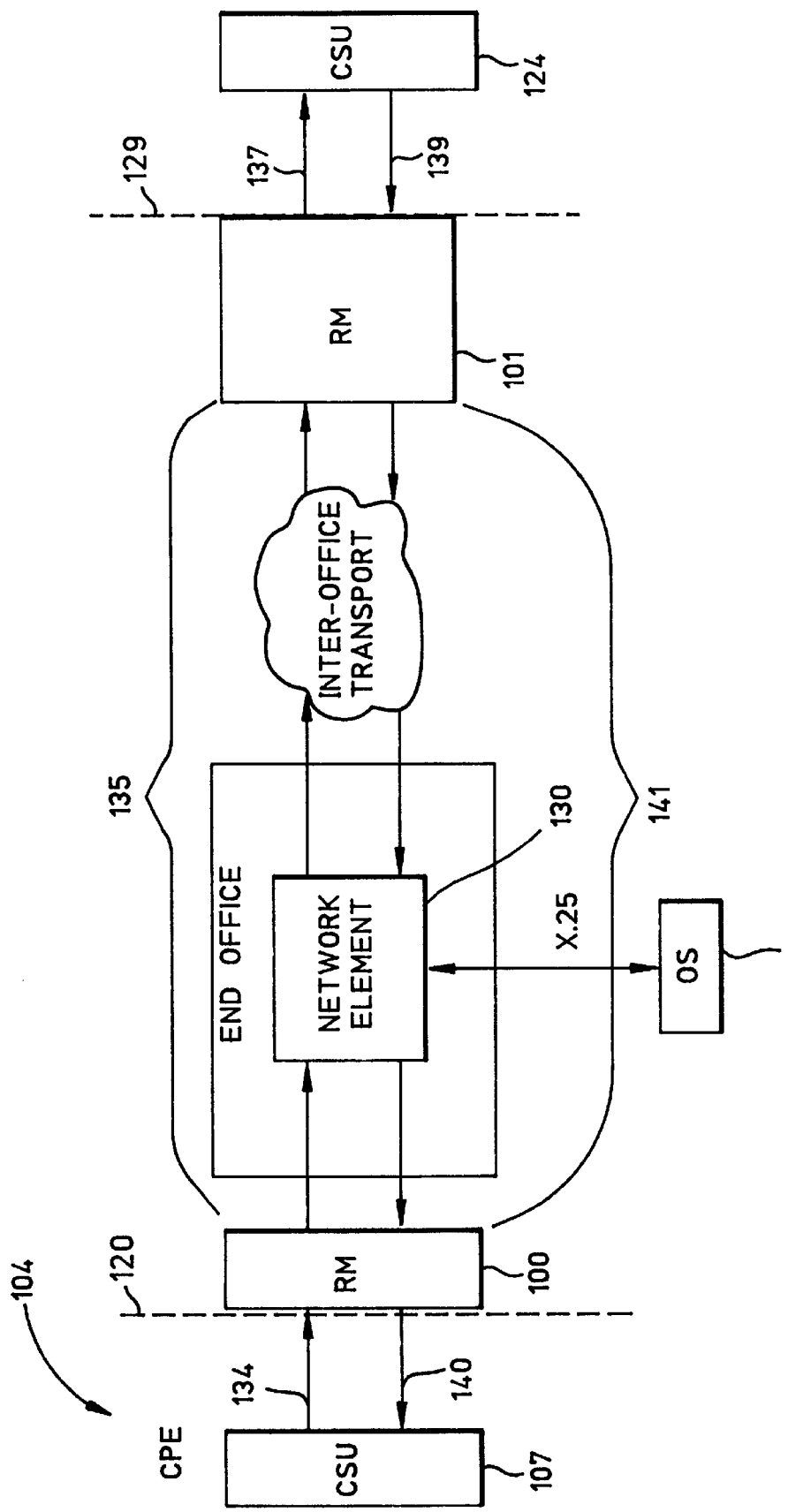
FIG. 3d is an illustration of a circuit in which a Remote Module in accordance with the present invention is located at both the near end network interface and the far end network interface.

FIG. 3*d* is an illustration of a circuit in which a Remote Module 100 is present at both the near end network interface 120 and the far end network interface 129. In a circuit such as the circuit shown in FIG. 3*d*, errors and alarms can be detected, stored, sectionalized, and reported by either Remote Module 100 or Remote Module 101 as originating in one of six legs. The first leg 134 is the same as the leg 134 of FIG. 3*c*. The second leg 135 includes that portion of the circuit from the output of the Remote Module 100 to the input of the Remote Module 101. The third leg 137 includes that portion of the circuit from the Remote Module 101 to the far end CSU 124. The fourth leg 139 includes that portion of the circuit from the far end CSU 124 to the Remote Module 101. The fifth leg 141 includes that portion of the circuit from the Remote Module 101 to the Remote Module 100. The sixth leg 140 is the same as the leg 140 shown in FIG. 3*c*.

In accordance with the preferred embodiment of the present invention, each Remote Module 100, 101 has the ability to convert SF signals into ESF signals. In addition, if the CSUs 107, 124 are not generating PRMs, then each Remote Module 100, 101 has the ability to generate PRMs which indicate the condition of the signal received at the Remote Module 100, 101 from the CSU 107, 124. In addition, a bit within the PRMs generated by the Remote Module 100 can be set to indicate whether errors are present on the signal that is received by the Remote Module 100 from the network on leg 141. Preferably, the U1 bit of the PRMs is set to indicate whether errors have been detected by the Remote Module 100 on leg 141, as disclosed in detail in U.S. Pat. No. 08/723,096, assigned to the assignee of the present invention and herein incorporated by reference.

If on the other hand, the CSUs are generating PRMs, then the Remote Modules 100, 101 do not generate PRMs, but rather supplement the PRMs generated by the CSUs 107, 124 with information that indicates whether the signal received from the network has errors and information that indicates whether the signals received from the CSUs 107, 124 have errors. When PRMs are being generated by a CSU 107, then a bit can be set in the PRMs that are generated by the Remote Module 101 to indicate whether errors are detected by the Remote Module 101 on leg 135. Preferably the U2 bit is set to indicate whether an error has been detected on the signal received by the Remote Module 100 from the CSU 107, as also disclosed in U.S. Pat. No. 08/723,096. A bit within the PRMs generated by the CSU 107 can also be set to indicate whether errors are present on the signal that is received by the Remote Module 100 from the network on leg 141. Preferably, the U1 bit of the PRMs is set for this purpose in the same manner as is the case when PRMs are generated by the Remote Module 100.

Therefore, the Remote Module 100 can determine whether any errors have occurred on leg 134 directly by checking the signal for errors. Errors on leg 135 can be detected by reading the PRM that will be generated by either the far end Remote Module 101 or the far end CSU 124. An indication is provided within the PRM that indicates the origin of that PRM. If the PRM originated at the far end Remote Module 101, then there is no way to determine whether any errors have originated on the leg 137. If, on the other hand, the PRM is generated by the far end CSU 124, then the Remote Module 100 can distinguish errors that originate on the leg 135 from errors that originate on the leg 137, assuming that errors do not originate on both legs 135 and 137. Errors which originate on leg 139 will be detectable by the Remote Module 100 by reading the bit (e.g., the 142 bit) that is set within the PRM generated by the far end Remote Module 101. Assuming errors that do not originate on not originate on both leg 139 and leg 141, the Remote Module 100 can detect errors on the signal on leg 141 directly and determine whether those errors are due to errors generated in leg 139 that were passed along by the far end Remote Module 101. Errors that occur in the leg 140 will only be detectable by the Remote Module 100 if the CSU 107 generates a PRM. If the CSU 107 is generating PRMs, then errors can be detected by the Remote Module 100 by reading the PRMs received from the CSU 107 on leg 134.

In accordance with one embodiment of the present invention, this information is stored until the Remote Module 100 is commanded to download. The commands to download and the information can be communicated in any of the ways described above. That is, the command to download can be communicated from the OS directly over a communications link between the OS and the Remote Module 100 which is outside the circuit. Alternatively the command can be sent from the OS to a network element 130 which is linked to the OS via a communications link and the network element transmits a command to the Remote Module 100 over the ESF data link between the network element and the Remote Module 100. In another embodiment, the command is sent from a test set that is either directly connected to the Remote Module 100 or connected to the Remote Module 100 through a modem. In yet another embodiment of the present invention, the command can be sent from the OS to a network element 130 which sends a command to the Remote Module 100 by encoding errors in a known pattern sent in the payload of the signal on the circuit. In yet another embodiment of the present invention, the command can be sent from the OS to a network element which encodes the command in the frame bits, as described above. Likewise, the download from the Remote Module 100 can be communicated in any of these ways as well. In one embodiment of the present invention, the particular manner in which the request and command are sent between the OS and the Remote Module 100 is selectable. The selection can include all of the ways described herein, a subset of these ways, or a superset of these ways.

In accordance with one embodiment of the present invention, in a circuit having an Remote Module at both ends of the network, such as shown in FIG. 3d, the leg in which an alarm condition originates can be determined as follows. Alarm conditions that originate at leg 134 are detected by directly monitoring the incoming signal to the Remote Module 100 from the CSU 107. The Remote Module 100 stores an indication as to whether a condition which would cause the Remote Module 100 to generate an alarm indication signal (AIS) is directly detected on either leg 134 or leg 141. Likewise, the Remote Module 100 can directly detect an AIS signal on either leg 134 or leg 141 and store an indication of such. Alarm conditions that originate on leg 135 can be detected by receipt at the Remote Module 100 of an RAI signal which is generated by the far end CSU 124. If the alarm condition originates on leg 137, then the Remote Module 101 at the far end will preferably modify the RAI signal generated by the far end CSU 124 (i.e., generate an "RAI-CI" signal) to indicate that the signal that was received by the far end Remote Module 101 indicates that no alarm condition was present. Therefore, the Remote Module 100 can detect an alarm condition exists on leg 137 by receipt of an RAI-CI signal on leg 141 from the network. If leg 139 is in alarm condition, the far end Remote Module 101 generates an AIS-CI signal.

Likewise, if an AIS signal is received by the far end Remote Module 100 from the CSU 124, then the Remote Module 100 will receive an AIS-CI signal on leg 141. If an alarm condition originates in leg 141, then the Remote Module 100 will receive either an AIS signal or the alarm condition will be directly detected by the Remote Module 100.

Encoding Information Using FBEs

In accordance with one embodiment of the present invention, information can be communicated from a first network element to a second network element by selectively introducing errors in the frame bits (i.e., selectively inverting the logic states of the frame bits) of the signal that is transmitted from the first to the second network element. For example, there are 8000 frames transmitted each second over a conventional DS1 circuit. Each frame includes one frame bit. Since some network elements monitor frame bit errors by observing only the $F_t$ bits (i.e., the frame bits associated with only the odd frames). Accordingly, in accordance with one embodiment of the present invention, only $F_s$ frame bits are inverted. This results in an encoding technique that is transparent to CSUs that are set to only detect framing errors in the $F_t$. In order to avoid causing an out-of-frame error condition, it is preferred to invert less than 20% of the total number of frame bits. Furthermore, the local density of inversions preferably should not exceed 20% of the total number of frame bits. Therefore, in accordance with one embodiment of the present invention, up to 3 bits within each 24 frames are selected for inversion. Accordingly, a network element or test set that is counting the number of FBEs would detect as many as 1000 FBEs per second. By dividing the number of errors that can be introduced into a number of ranges, each range representing a particular bit pattern, the FBEs can be used to encode information. For example, Table 2 illustrates the number of inversions to be introduced in order to encode particular bit patterns. Also illustrated in Table 2 is the range of FBEs that must be detected in order to detect the associated bit pattern.

| NUMBER OF FBEs TRANSMITTED | NUMBER OF FBEs DETECTED | PATTERN REPRESENTED BY FBEs |
| --- | --- | --- |
| 125 | 100–150 | 000 |
| 175 | 151–200 | 001 |
| 225 | 201–250 | 010 |
| 275 | 251–300 | 011 |
| 325 | 301–350 | 100 |
| 375 | 351–400 | 101 |
| 425 | 401–450 | 110 |
| 475 | 451–500 | 111 |

According to the encoding scheme illustrated in Table 2, 360 bits of information can be communicated in a two minute period. The use of ranges to represent particular bit patterns ensures that the information encoded in the FBEs will be robust in the face of normal framing errors. That is, even if as many as 25 frame bits are inverted each second by random errors, the pattern will be properly decoded. Depending upon the manner in which the bit pattern is to be used to communicate information from the Remote Module 100, it may be preferable to encode the bit pattern using an encoding technique that ensures that only one bit changes between any two adjacent ranges of FBEs, such as a commonly known gray code. Use of such an encoding technique can reduce the impact of detecting the wrong, number of errors when each bit in the pattern represents a different condition. In addition, one of the bits of the pattern to be encoded may be used to ensure that either even or odd parity is maintained. Accordingly, errors in the transmission can be detected. This scheme is particularly useful in the case in which a gray code is also implemented, since the number of additional errors that must occur in order to cause more than one bit to be incorrect is 1.5 times the width of a bin, i.e., 75 in the case of a bins that are 50 bits wide. In one embodiment of the invention, the number of inversions introduced is biased toward the bottom of the bin, since the probability that errors in transmission will invert one of the intentionally inverted bits is far lower than the probability that one of the other bits will be inverted. However, it should be understood that the size of the bins and the relative location of the number of inversions to be intentionally introduced will be implementation dependent.

The inversions are preferably selected to be performed on frame bits that occur nearest the center of the one second time interval to avoid miscounting the number of error that occur in any one second time interval.

It will be clear to one of ordinary skill in the art that other methods for encoding information by selectively inverting frame bits are possible.

Encoding Information Using payload Errors

In accordance with the present invention, information can be downloaded from the Remote Module 100 by selectively inverting bits within the payload. However, since the contents of the payload are not typically known to a network element 130 that is tasked with detecting the selected inversions being introduced, the Remote Module 100 must remove the circuit from service in the direction between the Remote Module 100 and the network element 130 (i.e., on leg 141). In place of the customer payload, the Remote Module 100 preferably transmits a framed all ones pattern. The second bit in each DS0 channel (i.e., the second bit in each 8 bits of the payload) is selectively errored to encode a message from the Remote Module 100. The following is the procedure that is preferably used in accordance with the present invention.

The Remote Module 100 is looped and a test pattern is transmitted from the network element 130. The test pattern is monitored by the network element 130 for a specified period of time to determine whether the circuit is operating sufficiently well to allow information to be downloaded. If less than a specified number of errors are observed by the network element 130 in the test pattern received from the Remote Module 100, then the download operation is allowed to proceed. In an alternative embodiment of the present invention, such loopback testing of the circuit before downloading is not necessary.

An instruction is sent to the Remote Module 100 which causes the Remote Module 100 to generate a framed all ones signal lasting a specified period of time (e.g., 20 seconds in one embodiment of the present invention). At some specified time during the transmission, the Remote Module 100 will force bits 2 of each channel to zero until a certain number of zeros have been transmitted (preferably between 0 and 99,999). The network element 130 or a test set initiates a measurement of errors in the all ones pattern carried by the payload. The network element 130 transmits the pattern error count to the OS (preferably over a direct communications link). The OS will decode the pattern of errors to interpret the message sent by the Remote Module 100.

In accordance with one embodiment of the present invention, a TL1 command as defined by Belcore is used to communicate between the OS and the network element 130.

A TL1 "MEAS-SIG-T1 " has the capacity to convey error counts in the pattern transmitted from the Remote Module 100 to the network element 130 from 00,000 to 99,999. Therefore, that range is selected to represent the message sent by the Remote Module 100. The range 0–99,999 is preferably divided into "bins". The center point of each bin will represent a particular binary value which is to carry performance and/or alarm information which has been stored by the Remote Module 100. The width of each bin is determined by the need to make the scheme robust to transmission errors in the system.

The selected inversions to the bits 2 of each channel are preferably applied in the center of a 20 second period to minimize the possibility that the delay between the time a TL1 command is issued and the time the Remote Module 100 responds will cause the network element to miscount the number of errors (or inversion of the bits 2) that the Remote Module 100 inserts. In accordance with one embodiment of the present invention, the bins are 704 inversions wide. This number is selected to allow a bit error ratio of 0.00001 to be tolerable. The Remote Module 100 causes a number of inversions that is in the center of each 704 wide bin. Therefore, for example, the first bin will be centered at 352 the second bin at 1056, etc. Accordingly, there will be 142 bins available. Therefore, if each bin represents one bit pattern, all combinations of 7 bits can be represented. In accordance with one embodiment, a Gray code can be used to ensure that only one bit in the 7 bit patterns represented by adjacent bins differ. For example, the 7 bit patterns "0000111" and "0001000" would not be represented by adjacent bins, since these patterns only differ by more than one bit.

In accordance with an alternative embodiment of the present invention, the number of bins is increased to 1388 by decreasing the size of each bin to 72 inversions per bin. This scheme can tolerate a bit error ratio of 0.000001. In accordance with this scheme, one unique 10 bit value can be presented by each bin. It should be noted that some bins will be left unassigned, since there are only 1024 unique 10 bit patterns. These patterns can be given particular significance as command patterns or indications. For example, one of these spare patterns may be used to indicate that there is no more information stored within the Remote Module 100. Another can be used to indicate that there is more information available in the Remote Module 100.

Commands to the Remote Module

In accordance with one embodiment of the present invention, the command from the network element 130 to the Remote Module 100 is a pattern of bits having a specified length which continuously repeats for a period of time. This pattern preferably is identifiable regardless of which bit is considered to be the first bit of the pattern. Such patterns are well known. In addition, the length of the pattern is preferably a prime number and not evenly divided into the length of the frame, superframe, or extended superframe. In one embodiment of the present invention, the pattern is an 11 bit pattern. This pattern is transmitted in band as a framed message, in band as an unframed message, or as a unframed message which has been overwritten with a frame bit pattern. Once the Remote Module 100 detects the message, the Remote Module 100 begins transmitting the all ones code having selected inversions to the network element. It should be noted that in an alternative embodiment of the present invention, the commands may be issued over the ESF DL, as a message encoded within a known pattern sent in the payload, or directly communicated to the Remote Module 100 over a direct communication link from either the OS or a test set. Furthermore, in accordance with one embodiment of the present invention, the method by which the command is received within the Remote Module 100 can be selected. In yet another embodiment, the Remote Module 100 is capable of receiving commands in any of these ways (or some subset of these ways), and will respond equally to each. In addition, it should be understood that the present invention may operate such that commands are communicated in one manner, such as in a framed 11 bit repeating pattern, and download is performed in another manner, such as by selectively inverting the framing bits or selectively inverting bits of a pattern that is generated by the Remote Module 100.

Remote Module

FIG. 3a shows a public DS1 network employing a Remote Module 100 in accordance with the present invention. As shown in FIG. 3a, the Remote Module 100 is preferably placed at the point of demarcation (network interface) 102 between the customer premises equipment (CPE) 104 and the telephone network 106. In one embodiment shown in FIG. 3a, the telephone network 106 includes two end offices 108 and an inter-office transport 110. The CPE 104 comprises a channel service unit (CSU) 107. The end offices 108 include an office repeater 112, an M13 block 114, a test and performance monitoring equipment block 116, and a fiber optic terminal (FOT) interface 118. The office repeater 112 is passive to the DS1 digital signal for transmission to the Remote Module 100. The multiplexer portion of an M13 block 114 accepts 28 DS1 signals which may or may not be operating asynchronously and multiplexes them into a single DS3 signal using the DS2 level of the North American hierarchy as an intermediate step. The demultiplexer portion of the M13 block 114 reverses the process dismantling the DS3 signal into its 28 constituent DS1s. The test and performance monitoring equipment block 116 monitors the data transmitted between the two Remote Modules 100. The inter-office transport 110 may include one or a plurality of fiber optic links, line of sight microwave link, or any other transport means. In these cases, the FOT 118 may be replaced with an appropriate transport interface.

The Remote Module 100 combines, in a compact and an inexpensive unit, the CPE-to-telephone network interface, controlled circuit loop-back, frame format conversion, and CPE loss of signal (LOS) identification functions. The Remote Module 100 provides three major features which enhance the performance monitoring and testing capability of the network providers.

First the Remote Module 100 can optionally convert the CPE generated Superframe (SF) formatted digital signals into Extended Superframe (ESF) formatted signals for transmission over the DS1 transmission system. Frame format conversion allows the local exchange carriers (LFCs) to conform their networks to the superior ANSI T1.403 ESF frame format ("ESF frame format"). The ESF frame format permits "Performance Report Messages" (PRMs) to be transmitted together with digital data over the DS1 transmission system. In addition, the FSF frame format enables the LECs to perform non-intrusive, continuous performance monitoring of both the CPE 104 and the telephone network 106.

Second, the present invention is capable of performance monitoring using the ANSI T1.403 ESF Data Link (DL). Cyclic Redundancy Codes (CRCs) and other performance monitoring data can be generated at one end of a DS1 transmission system and periodically (i.e., preferably once per second) transmitted back to some other point in the system in a non-intrusive manner using the ESF DL. For example as shown in FIG. 3b, a CRC code may be written into the data stream via the CSU 107. Errors can be detected by the Remote Module 100 and transmitted in PRMs in an ESF-converted digital signal. The PRMs can then be read by network elements located throughout the DS1 transmission system. For example, the PPMs may be read by the test and performance monitoring block 116. Alternatively, the PRMs may be transmitted throughout the network using the ESF format and may therefore be made available to local users or an OS. As shown in FIG. 3b, if present, the test and performance monitoring block 116 serves as a central hub for collecting performance monitoring data which is transmitted as ESF-formatted DS1 digital signals. In alternative embodiments of the DS1 transmission system shown in FIG. 3b, the test and performance monitoring block 116 is modified to screen and analyze performance monitoring data which is generated by the Remote Modules 100 in accordance with the present invention. In this alternative embodiment, the test and performance monitoring block 116 functions as a mediation device for the Operations Systems. In an alternative embodiment of the present invention shown in FIG. 3c, any appropriately configured network element may serve as a mediation device of the OS.

Third, the present invention increases the value and utility of the test and performance monitoring blocks 116 currently in use in intra-LATA (Local Access and Transport Areas) circuits by enhancing the sectionalization capability of existing DS1 transmission systems. The sectionalization function performed by the test and performance monitoring blocks 116 on the intra-LATA circuits is shown in FIGS. 3a and 3b. The Remote Module 100 enables the test and performance monitoring blocks 116 to non-intrusively sectionalize problems occurring within the DS1 transmission system on intra-LATA circuits, and thereby greatly enhances troubleshooting capability. The Remote Module 100 allows the LECs to sectionalize trouble by allowing the PRMs which are generated by the Remote Module 100 to be read at several different locations throughout the DS1 transmission system. By monitoring the difference in error counts at various locations within the network, at which performance monitoring information is collected, troubled network elements can be quickly and efficiently isolated to specific sections within the DS1 transmission system. More particularly, the Remote Module 100 determines whether signals received from either the network or the CPE have errors. By comparing the number of errors detected in the signal that was received at the network interface by the Remote Module 100 with the number of errors in the signals received at the end office 108 and the CPE 104, a determination can be made as to whether the errors occurred in the leg 134 of the circuit that exists between the Remote Module 100 and the CPE 104 or the Remote Module 100 and the end office 108.

In accordance with the preferred embodiment of the present invention, the Remote Module 100 preferably has the ability to monitor Events, including all of the DS1 performance primitives and parameters defined within the American National Standards Institute publication ANSI T1.231. These include: performance anomalies, such as line anomalies (including bipolar violations (BPV) and excessive zero (EXZ)), path anomalies (such as cyclical redundancy check errors, frame bit errors, line defects, such as Loss of signal (LOS)), and path defects (such as out of frame (OOF) and alarm indication signal (AIS)).

In addition to directly monitoring the signals received from either the CPE 104 or the network, the Remote Module 100 has the ability to decode scheduled messages, such as a Performance Report Message (PRM) transmitted by the CSU 107, and unscheduled messages, such as RAI in ESF format. In accordance with ANSI T1.403, PRMs include information regarding the signal that was received by the device which generates the PRM. ANSI T1.403 PRMs include a bit for determining whether the PRM was generated within the customer installation (CI) or by the carrier. The PRM also includes data concerning the status of the signal over the last four seconds, including: (1) how many CRC errors were present; (2) whether a severely errored frame occured; (3) whether a frame synchronization bit error event occurred; (4) whether a line code violation event occurred; (5) whether a slip event occurred; and (6) whether payload loopback is activated. In accordance with one configuration of the present invention, PRMs are generated by the CSU 107. Accordingly, the Remote Module 100 can determine the status of signals transmitted over the leg 140 between the Remote Module 101 and the CSU 124.

The Remote Module 100 preferably records the occurrence of a condition referred to as Alarm Indication Signal— Customer Installation (AIS-CI) which indicates that trouble which would lead to the generation of AIS on leg 136 by a network element upstream of the Remote Module 100 is present in the signal that is received by the Remote Module 100 from the CSU 107 on leg 134. In accordance with the preferred embodiment of the present invention, the Remote Module 100 also generates a signal (e.g., generates a variant of the conventional AIS signal, or modifies the received AIS signal) to indicate the condition to upstream devices. The Remote Module 100 also preferably records the occurrence of a condition referred to as Remote Alarm Signal— Customer Installation (RAI-CI) which indicates that an RAI signal was received by the Remote Module 100 from the CSU 107 on leg 134 and that the cause of that signal was not detected on the signal received at the Remote Module 100 from an upstream network element on leg 138. In accordance with the preferred embodiment of the present invention, the Remote Module 100 also generates a signal (e.g., generates a variant of the conventional RAI signal, or modifies the received RAI signal) to indicate the condition to upstream devices.

AIS-CI

In addition to supplementing the PRMs generated by the CSU 124, the Remote Module also preferably provides additional information regarding the origin of AIS and RAI signals. In the preferred embodiment, the AIS-CI signal is a variant of the AIS signal defined in T1.403 Clause 9.2. Preferably, the density of ones within the AIS-CI signal is such that the signal will be detected as an ANSI T1.403 AIS signal. However, the density of zeros is such that equipment that is designed to detect the signal as an AIS-CI signal will be able to distinguish the signal from an all ones signal. The AIS-CI signal is preferably a repetitive interleaving of 1.11 seconds of an unframed all ones pattern and 0.15 seconds of all ones modified by the AIS-CI signature. The AIS-CI signature alters one bit at 386 bit intervals in the DS1 signal. In accordance with one embodiment of the present invention, the AIS-CI signature is the pattern "0111110011111111" (right to left) in which each of these bits is inserted at the beginning of a series of 386 bits. This results in a repetitive pattern 6176 bits in length in which, if the first bit is numbered bit 1, bits 3088, 3474, and 5790 are logical zeroes and all other bits in the pattern are logical ones. In the preferred embodiment of the present invention, a candidate AIS-CI signal is declared to be AIS-CI if 99.9% of the bits in the signal conform to the AIS-CI signature pattern. In an alternative embodiment of the present invention, a plurality of signatures may be defined, each being unique to a particular location within the data path. Accordingly, when an AIS signal is generated, if the Remote Module 100 is the first device to generate that AIS signal, the signal will be modify by imposing the AIS-CI signature, thus allowing equipment further upstream to determine the point within the data path at which the signal was lost. If an AIS signal is received by the Remote Module 100, then the Remote Module 100 will modify the AIS by imposing the AIS-CI signature.

RAI-CI

In accordance with one embodiment of the present invention, the RAI-CI signal is defined as a frame format dependent signal carried on the DL, associated with the signal. When the signal being transmitted from the Remote Module is in ESF format and the following conditions are met: (1) RAI is detected in a SF-formatted signal from the CI, and (2) no condition leading to the declaration of RAI is detected in the signal from the network, then the RAI-CI signal is generated as an unscheduled message corresponding to ANSI T1 Extended Superframe RAI modified as follows. For a period of 90 milliseconds every 1.08 seconds, the unscheduled message "0000000011111111" (right to left) in the DL is replaced with the message "0011111011111111" (right to left). This signal satisfies the definition set forth in ANSI T1.403-1995 section 9.1. Accordingly, additional information is provided from which a can determine whether a received RAI message is provided in response to an Event that originated at the CPF or LEC.

If, on the other hand, the signal is being transmitted by the Remote Module toward the network in SF format, then the Remote Module shall issue RAI-CI toward the network by setting bit 3 of every channel in each frame to logical one if the above stated conditions are met. That is, if (1) RAI is detected in a SF-formatted signal from the CI, and (2) no condition leading to the declaration of RAI is detected in the signal from the network. No other bits including the stream of logical zeroes in bit 2 of every channel which indicates RAI, shall be modified.

Performance Monitoring

In addition to monitoring alarm conditions the Remote Module 100 preferably performs performance monitor operations upon the signal received from the CPE 104. The parameters which are monitored by the Remote Module to generate PRMs are CRC errors, frame bit errors, line code violations (e.g., BPVs) and slips. In accordance with the ANSI Standard T1.231- 1993, the Remote Module 100 detects an errored second (ES). An error condition is determined by logically-ORing the occurrence of one or more Bipolar Violations within a measured second having frame bit errors. If an error condition is detected, bit U2 (as defined by ANSI standard T1.403-1989) of the next PRM generated and sent to the a logical 0 to a logical 1. Patterns having the following definitions are written into the 4 Kb/s DL channel (using the unused R bits in the PRMs):

TABLE 1

| BIT PATTERNS* | DEFINITIONS |
| --- | --- |
| 00000000..... | No Remote Module present or Remote Module disabled. |
| 11111111..... | Remote Module is generating PRMs which displace any data transmitted by the CPE on the DL. |
| 10101010..... | Remote Module hardware fault detected. |
| 10001000..... | Remote Module present but simply passing PRMs, no generation of PRMs. |

When the ESF data link does not carry a PRM, it is flag-filled with the following pattern: 01111110. If an LOS is detected from the network, the present Remote Module 100 transmits an RAI priority message to the telephone network 106. Such a message overwrites any PRM data being transmitted. This RAI feature may be optionally disabled.

When the CPE uses an ESF-formatted signal, the Remote Module 100 treats the DL channel in a different manner depending upon the ESF format generated by the CPE. For example, if the CPE uses an ESF without PRMs, the Remote Module 100 generates PRMs and inserts them on the unused capacity of the DL, channel. However, since the signal is already in ESF format, the Remote Module 100 does not need to perform SF-to-ESF conversion in this case.

If the CPE 104 uses an ESI with ANSI T1.403 PRMs, the Remote Module 100 does not generate new PRMs. Instead, the Remote Module 100 measures the performance of the signals received from the network and from the CPE 104. If parameters are measured in the signal from the network, which would result in a non-zero parameter in a PRM, bit U1 of the next PRM which has passed through the Remote Module 100 from the CPE 104 to the telephone network 106, is changed from a logical 0 to a logical 1 value. If parameters measured in the signal from the CPE 104 result in a non-zero parameter in a PRM, bit U2 of the next PRM, which is passed through the Remote Module 100 from the CPE 104 to the telephone network 106, is changed from a logical 0 to a logical 1 value.

If the CPE 104 uses an ESF format with AT&T PUB 54016 Performance Reporting, the Remote Module 100 generates PRMs and inserts them in the unused capacity of the DL channel. However, as before, there is no need to perform a frame format conversion. The Remote Module 100 monitors the signal received from the network for AT&T-formatted maintenance messages. Upon observing the completion of an AT&T-formatted maintenance message, the Remote Module 100 suppresses the transmission or completion of transmission of PRMs which are generated by the Remote Module 100 until either the station polled by the message completes transmission of its response message or until 500 milliseconds elapse without a transmission from the polled station. The Remote Module 100 generates ANSI-formatted PRMs and interleaves them with the AT&T PRMs generated by other network elements. Performance monitoring is not performed on unframed signals.

Event Levels

As part of the sectionalizing function of the preferred embodiment of the present invention, the Remote Module 100 of the present invention preferably assigns a value from 0–7 to each leg 134, 136, 138, 140 of the data path. Each value corresponds to one of eight Event Levels, as shown in Table 1.

TABLE 1

| Event Level 0 | no errors are present |
|---|---|
| Event Level 1 | presence of an Errored Second |
| Event Level 2 | presence of a severely Errored Second |
| Event Level 3 | not assigned in the preferred embodiment |
| Event Level 4 | Remote Alarm Indication |
| Event Level 5 | Alarms (LOS, OOF, AIS) |
| Event Level 6 | RAI-CI |
| Event Level 7 | AIS-CI |

It should be noted that both alarm conditions which indicate a complete loss of the ability to decode the payload, and conditions which merely indicate a degradation in the signal quality due to errors in either the payload or the overhead, are considered concurrently by the present invention in determining the origin of an Event. That is, Events are defined to include both complete loss of the ability to decode the payload and conditions which merely indicate a degradation in the signal quality. However, it should be understood that in the preferred embodiment of the present invention, Events may be accurately sectionalized only if there is one source of the Event. If Events originate at more than one location within the data path, then the present invention may not be able to determine the origin of the Events.

Initially, the Sectionalizer within the Remote Module 100 of the present invention reformats the performance monitoring data that has been acquired and determines the Event Level associated with each leg of the data path. For example, the Event Level of leg 134 is determined as follows.

The first step in determining the Event Level associated with leg 134 is to read the performance data collected by the Remote Module 100 to determine whether an AIS-CI condition exists. If so, then the Event Level associated with leg 134 is set to 7. If not, then a determination is made as to whether a loss of signal (LOS) or an out-of-frame (OOF) condition is being received at Remote Module 100 on leg 134. If so, then the Event Level associated with leg 134 is set to 5. If not, then a determination is made as to whether the Remote Module 100 is receiving an RAI signal. If so, then the Event Level associated with leg 134 is set to 4. Event Level 3 is unused in the embodiment of the present invention in which the Event Levels are defined as shown in Table 2.

If the performance data received on leg 134 indicates that no LOS, OOF, AIS, or RAI is presently being received by the Remote Module 100 and no AIS-CI or RAI-CI condition exists, then the next determination to be made is whether the signal received over the last second at the Remote Module 100 is considered to be a "Severely Errored Second" (Event Level 2) or an Errored Second (Event Level 1).

In accordance with one embodiment of the present invention, a DS 1 Severely Errored Second is defined to include each of the following:

(1) a severely errored second-line (SES-L) as defined by ANSI T1.231-1993 at paragraph 6.5.1.3; and (2) a severely errored second (SES-P) as defined by ANSI T1.231-1993 at paragraph 6.5.2.5.

If no Severely Errored Second has been detected by the Remote Module 100, then the Sectionalizer of the Remote Module 100 reads the performance primitives and parameters collected by the Remote Module 100 to determine whether Event level 1 should be associated with leg 134. Accordingly, the Sectionalizer reads the performance monitoring data related the signals received over leg 134 over the last second to determine whether either a Errored Second has occurred.

In accordance with one embodiment of the present invention, a DS1 Errored Second is defined as any one of the following:

(1) an errored second-line (ES-L) as defined by ANSI T1.231-1993 at paragraph 6.5.1.2;

(2) an errored second-path (ES-P) as defined by ANSI T1.231-1993 at paragraph 6.5.2.2;

(3) an errored second type A (ESA-P) as defined by ANSI T1.231-1993 at paragraph 6.5.2.3;

(4) an errored second type B (ESB-P) as defined by ANSI T1.231-1993 at paragraph 6.5.2.4; and (5) a frame bit error (FBE) as defined by ANSI T1.231-1993 at paragraph 6.1.1.2.2

It should be clear to one of ordinary skill in the art that the particular performance primitives and parameters that are considered is implementation dependent. Therefore, alternative embodiments of the present invention may either define Errored Seconds differently, or may use other performance primitives and parameters to determine the status of the signal that is received by the Remote Module 100. In particular, in accordance with one embodiment of the present invention, the presence of frame bit errors in the signal received from the CSU 107 by the Remote Module 100 will cause an Event Level 1 indication.

With regard to leg 140, the Sectionalizer within the Remote Module 100 reads the performance monitoring information received in the Remote Module 100 on leg 134 to determine whether an RAI-CI condition exists. If so, then Event Level 6 is associated with leg 140. Otherwise, assuming that the CSU 124 is generating PRMs, the Sectionalizer reads the performance monitoring information received by the Remote Module 100 to determine whether any of the following have occurred: (1) a CRC error event; (2) a severely errored framing event; (3) a frame synchronization bit error event or out of frame condition; (4) a line code violation event; (5) a controlled slip event; (6) an excess zero condition; (7) presence of an alarm indication signal; (8) presence of a remote alarm indication; or (9) loss of signal. It will be understood by those skilled in the art that the Remote Module 100 receives information through the PRM regarding the status of leg 140. In accordance with one embodiment of the present invention, if any of the above mentioned five events have occurred (i.e., any Performance Monitoring (PM) bits of an ANSI PRM are asserted) then Event Level 1 is associated with leg 140.

With regard to leg 136, the same method may be used as was described above for determining the Event Level of leg 140. Similarly, the method used to determine the Event Level of leg 138 as was described with regard to leg 134.

It should be understood that if the circuit is operating using SF formatted signals, no PRMs will be received on legs 134 or 138. In that case, the only information that will be available regarding the status of legs 136 and 140 will be provided by receipt of in RAI signal on either leg 134 (indicating that leg 140 is in alarm condition) or on leg 138 (indicating that leg 136 is in alarm condition).

Generation of Masks

In accordance with the preferred embodiment of the present invention, a "Mask" is generated within the Remote Module 100 to indicate the Event Levels associated with each leg of the circuit from the perspective of the Remote Module 100. The Mask is a 26 bit long word in which the first 3 bits represent the Event Level associated with leg 134, the second 3 bits represent the Event Level associated with leg 135, etc. In addition to the 18 bits which represent the Event Levels associated with each of the six legs, three pairs of one bit flags are preferably provided as part of the Mask to indicate various conditions. The first pair of these flags (RM-1, RM-2) indicate whether a Remote Module is present between the each CSU 107, 124 and the network element 130, each flag indicating the presence of one of the two Remote Modules 100, 101. The second pair of flags (CP-1, CP-2) indicate whether PRMs are being generated by each CSU 107, 124, each flag relating to one direction. The third pair of flags (SI-1, SI-2) indicate whether the Sectionalizer algorithm within the Remote Module 100, 101 is still working to determine the origin of the event (i.e., "Signal Identification" is in progress), each flag relating to one direction. The value of these flags may be transmitted to a user in a message.

In accordance with one embodiment of the present invention, the Remote Module 100, 101 is capable of composing messages which can be transmitted over any communications links available to the Remote Module 100, 101 using conventional protocols, such as the Transaction Language 1 (TL1) protocol defined by Bellcore and used in communications between the network elements and an Operations Systems (OSs). The format for such messages is provided below.

Depending upon the available bandwidth of the communications link between the Remote Module 100, 101 and the receiving device, the Event Levels determined for each leg of each signal can be output from the Sectionalizer in one of three "Modes": (1) Filtered Mode, in which the raw information received from the components of the data path are subjected to a filtering process to correlate the Events and provide a more stable output Mask; (2) History Mode, in which the output comprises a collection of previously stored filtered Masks, each representing the Event Levels of each leg of the data path at a point in time. In the preferred embodiment of the present invention, each filtered Mask is stored upon a determination that the leg in which an Event originated has changed; and (3) Current Mode, in which the most recently determined Event Levels are output without filtering.

Once the Event Levels associated with each of the six legs of the circuit are determined, the Remote Module 100 preferably implements a two stage filter procedure for each leg of the circuit to be sectionalized. Filtering is preferably performed regardless of which output Mode is selected. Filtering allows the present invention to perform an automatic time correlation function. That is, each monitoring device (e.g., Remote Module, Sectionalizer, CSU, etc.) determines that an Event has occurred when errors are detected during a one second interval. Therefore, an Event that causes errors to occur over a period of 0.75 seconds may be seen by one monitoring device to have occurred entirely within a particular one second interval. However, another monitoring device may detect the Event as having occurred over a period which straddles two different one second intervals (i.e., a first portion of errors occurred in a first second interval, and a second portion of errors occurred in a next one second interval). In order to determine that the errors that are seen at one location are the same errors that were seen at another location, the one second intervals should be synchronized to one another. However, such synchronization is cumbersome. In accordance with the present invention, rather than synchronizing the one second intervals, the following filter function is applied in one embodiment of the present invention to ensure that an Event that is reported in two different seconds by one device and in only one second in a second device is detected as being one and the same Event. It will be understood that in accordance with an alternative embodiment of the present invention, no filtering is performed.

First Stage Filtering

Figure 4:
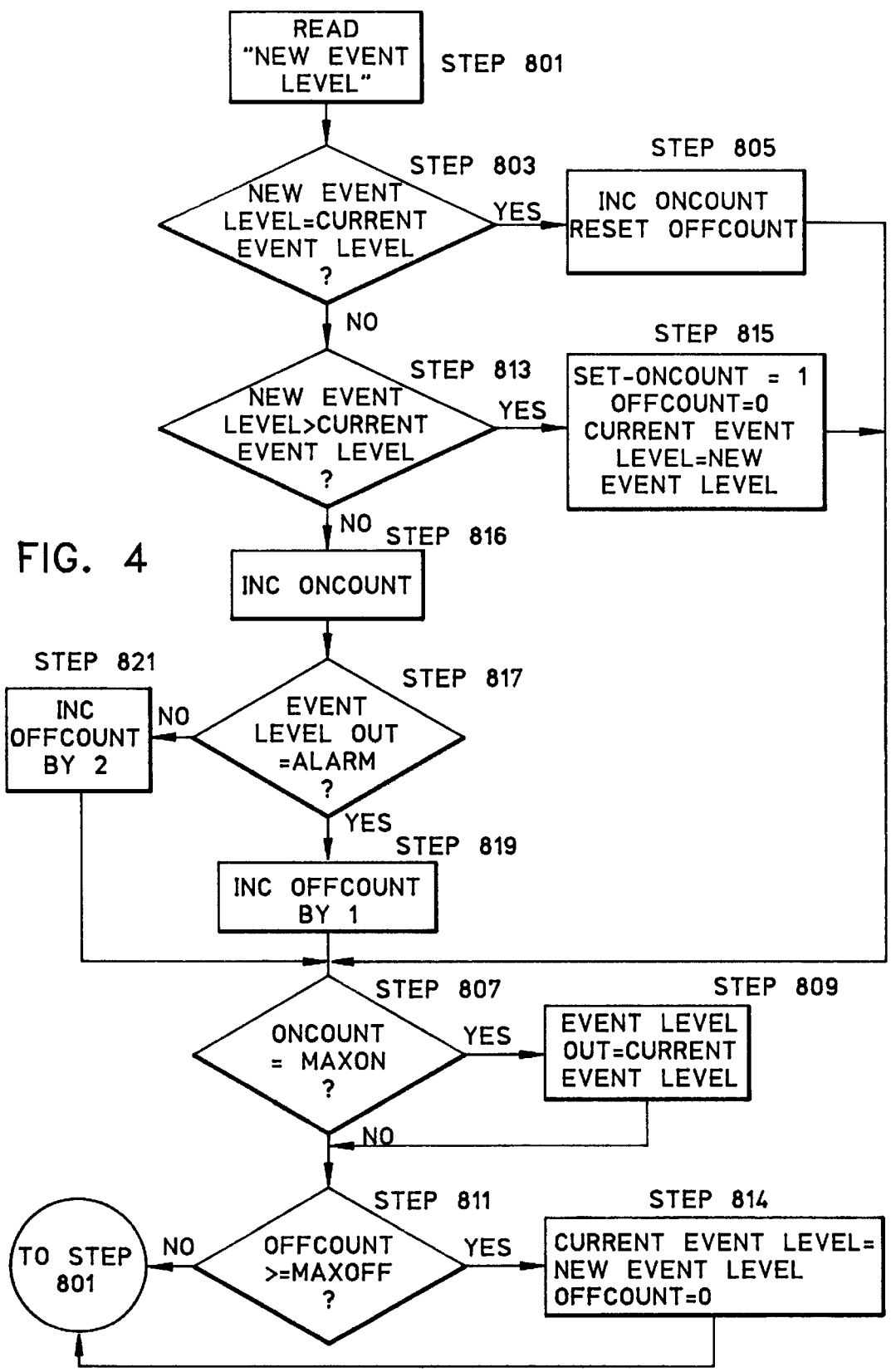
FIG. 4 is a flowchart of the first stage of the filter in accordance with one embodiment of the present invention.

FIG. 4 is a flowchart of the first stage of the filter. The first stage of the filter reduces the number of changes which occur in each Event Level by updating the Event Level only when the value of the Event Level increases or when the value of the Event Level has decreased and remains at a decreased Event Level for a predetermined amount of time. The duration of the predetermined amount of time is preferably dependent upon the value of the Event Level last output from the first stage filter.

Referring to FIG. 4, a "New" Mask is read from the memory within the Remote Module 100 at one second intervals (STEP 801). Initially, the New Mask is checked to determine whether the data path is either out of service or under test. In accordance with one embodiment of the present invention, the fact that the data path is out of service is indicated by setting the New Event Level associated with leg 134 and leg 138 to an Event Level of "7" within the Mask. It should be clear that an indication that AIS-CI is present is inappropriate for legs 134 and 138 (i.e., an AIS-CI can never occur on either leg 134 or leg 138). Therefore, an Event level "7" on leg 134 and 138 is redefined to indicate that the data path is out of service. Likewise, an Event Level "6" is inappropriate for either leg 134 or 138. Therefore, in accordance with one embodiment of the present invention, Event Level "6" has been redefined to indicate that the data path is under test. In accordance with the present invention, if the data path is out of service, then the New Mask is overwritten with Event Level "7" in each leg. Similarly, if the data path is in test, then the New Mask is overwritten with Event Level "6" in each leg. If the data path is either out of service or under test, then the New Mask will not have any information that indicates whether a Remote Module is present or whether PRMs are being generated by the CPE. Therefore, in accordance with one embodiment of the present invention, information regarding the presence of a Remote Module and PRMs generated by the CPE is read from an output register of the first filter, which remains unchanged from the last time a received Mask indicated that the data path was not under test or out of service. The information read from the output register is copied into the New Mask.

The New Event Level is then compared with a "Current Event level" (STEP 803). Initially, the Current Event Level is set to zero. Therefore, if the Event Level for that particular leg is 0 (i.e., there were no Events on that leg), then an "On-Count" value is incremented from an initial value of zero and an "Off-Count" value is reset to zero (STEP 805). The value of the On-Count is then checked to determine whether the On-Count value is greater than a "Max-On" value (STEP 807). The Max-On value is selected to provide stability. In the preferred embodiment of the present invention, the Max-On value is equal to 3.

Since the On-Count will not be equal to the Max-On value the first time through the loop, the value of the Off-Count is compared to a "Max-Off" value (STEP 811). Likewise, the Off-Count will not be equal to the Max-Off count the first time through. Therefore, the process returns to STEP 801. If the New Event Level remains the same as the Current Event Level sufficiently long for the On-Count to increment up to the value of the Max-On value, then the Event Level Out will be set to the value of the Current Event Level. That is, the Current Event Level will have remained stable for a sufficiently long time to pass through the first stage filter and will be output. As long as the New Event Level remains unchanged, the process will continue in this loop.

However if the New Event Level becomes greater than the Current Event Level (e.g., an errored second is detected in the leg) (STEP 813), then the On-Count is reset to one, the Off-Count is reset to zero, and the Current Event Level is updated with the value of the New Event Level (STEP 815). Since the On-Count will not be equal to the Max-On value (STEP 807), and the Off-Count will not be equal to the Max-Off value (STEP 811), the process returns to STEP 801. If the New Event Level persists for the number of passes required to increment the On-Count value to the Max-On value (STEP 807), then the Event Level will be output from the first stage of the filter by setting the value of the Event Level Out to the value of the Current Event Level (STEP 809).

If, however, the New Event Level is less than the Current Event Level (STEP 803) during one of the passes before the Max-On value is exceeded by the On-Count, then the On-Count will be incremented (STEP 816) and also the Off-Count will be incremented. In accordance with the embodiment of the present invention shown in FIG. 4, the amount by which the Off-Count is incremented is determined by checking whether the Event Level Out value is greater than a predetermined Event Level value, such as "3" in the case shown, (indicating that the event detected is an alarm condition). If greater than "3", then the Off-Count is incremented at a relatively slow rate (e.g., by one) (STEP 819). If, however, the Event Level is not greater than "3", then the Off-Count is incremented at a relatively rapid rate (e.g., by two) (STEP 821). In either case, it can be seen that in accordance with the first stage of the filter of FIG. 4, the value of the Current Event Level is not updated with the value of the New Event Level. Therefore, the higher previously read Event Level will be held until the Off-Count is exceeded in STEP 811. In accordance with the preferred embodiment of the present invention, the On-Count will always become equal to the Max-On value before the Off-Count equals or exceeds the Max-Off value. Accordingly, the highest Event Level will always be output from the first stage of the filter.

If the New Event Level remains below the Current Event Level for a sufficient number of passes for the Off-Count to become equal to or greater than the Max-Off value, then the Current Event Level is updated to the value of the New Event Level, the Event Level Out is set to the value of the Current Event Level, and the Off-Count is reset to zero (STEP 814). The filter process than repeats from STEP 801.

It can be seen that the first stage of the filter operates to reduce the number of times the Event level Out changes by only changing the output value when the New Event Level drops and remains lower for a predetermined amount of time or the New Event Level increases. Furthermore, it should be noted that the first stage of the filter operates on the Event Level associated with each leg independently.

Second Stage Filtering

Figure 5:
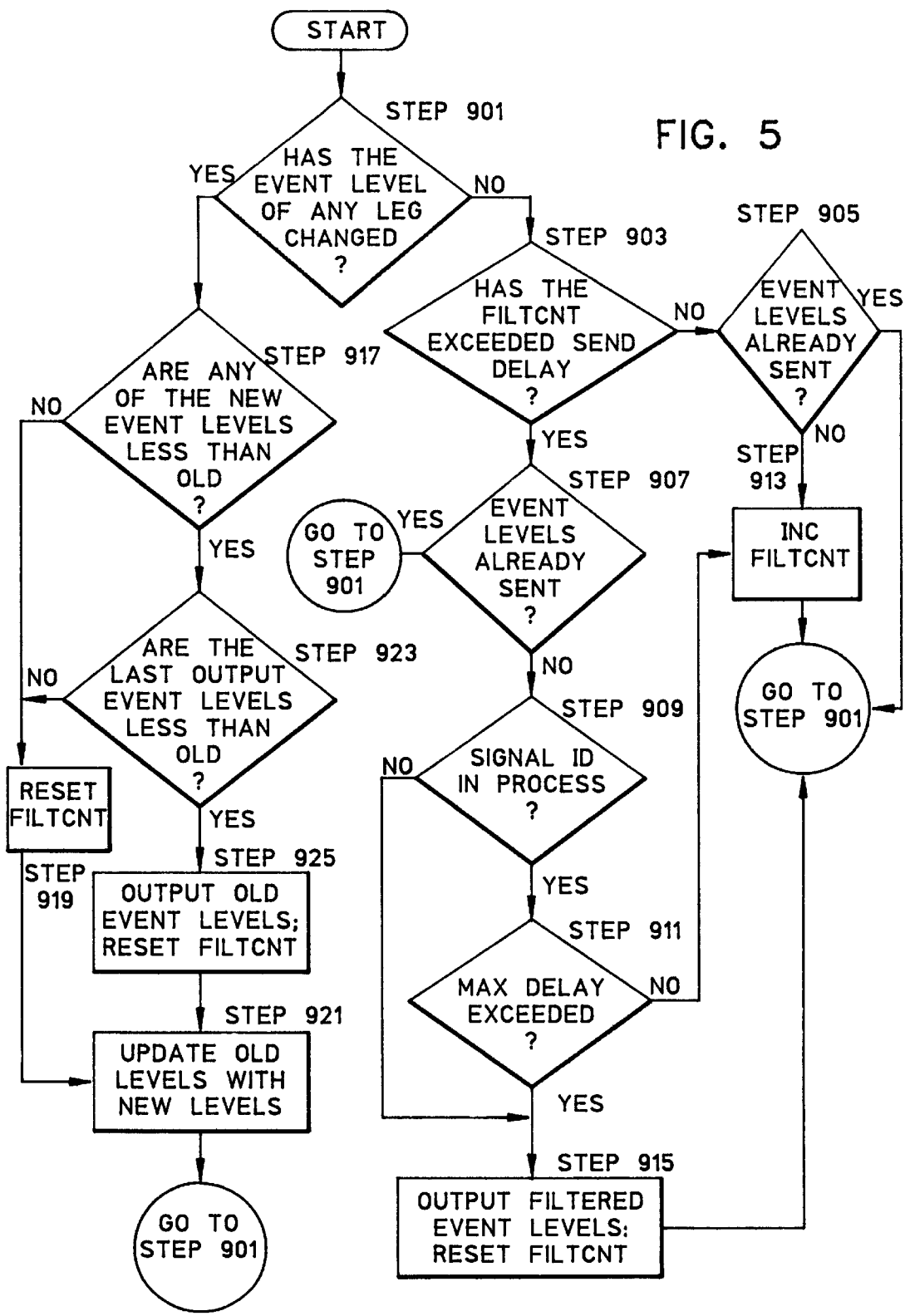
FIG. 5 is a flowchart of the process of the second stage of the filter in accordance with one embodiment of the present invention.

The second stage of the filter operates on the Event Levels associated with all of the legs of the circuit concurrently. FIG. 5 is a flowchart of the process of the second stage of the filter. Initially, the Event levels associated with each leg are checked for any change between the New Event Levels and the Old Event Levels (STEP 901). If there has been no change in the Event Levels, then a check is made to determine whether a "Filt-Cnt" value is greater than a predetermined value (STEP 903). If not, then a check is made to determine whether the Old Event Levels have previously been output from the second filter (STEP 905). If so, then the process returns to STEP 901. If not, then the value Filt-Cnt is incremented and then the process returns to STEP 901.

If the Old Event Levels have not been previously output, and these steps are repeated for a sufficient number of times, the value of Filt-Cnt will eventually exceed the predetermined value (which it can be seen represents a "Send Delay" in the output of the Event Levels from the second filter). Once this delay is exceeded (STEP 903), another check is made to determine whether the Old Event Levels have been output previously (STEP 907). If so, then the process loops back to STEP 901. If not, then a determination is made as to whether "Signal Identification" is in progress (STEP 909). That is, as stated above, the far end Remote Module 101 has the ability to modify AIS and RAI signals to indicate whether those signals are due to an Event that originated at the customer installation or in the LEC/IEC equipment. However, decoding these signals requires monitoring them for a period of time. For example, in one embodiment of the present invention, the AIS-CI signal is identical to the AIS signal for 1.11 seconds, after which the preceding 0.15 seconds are uniquely modified. Likewise, the RAI-CI signal is identical to the RAI signal for 0.99 seconds, after which the preceding 0.090 seconds are uniquely modified. Since the length of a complete modified signal takes 1.26 seconds in the case of AIS-CI and 1.08 seconds in the case of RAI-CI to transmit, Signal Identification requires this amount of time. Therefore, Signal Identification takes place during the time that the near end Remote Module 100 is attempting to determine whether a received RAI or AIS signal has been modified to an RAI-CI or an AIS-CI signal by the far end Remote Module 101. If Signal Identification is in progress, then a check is made to determine whether a "Max Delay" value has been exceeded by the value of Filt-Cnt (STEP 911). If not, then the value of Filt-Cnt is incremented (STEP 913) and the process returns to STEP 901. However, if the value of Filt-Cnt is equal to or greater than the Max Delay value, the Event Levels are output and the Filt-Cnt value is reset to zero (STEP 915). Next the process returns to STEP 901.

If the Event Levels input to the second stage of the filter change (STEP 901), then a determination is made as to whether any of the New Event Levels are less than the Old Event Levels (STEP 917). If not, then the Filt-Cnt value is reset to zero (STEP 919) and the Old Event Levels are updated with the New Event Levels (STEP 921). The process then returns to STEP 901. However, if at least one of the New Event Levels associated with one of the legs is less than one of the Old Event Levels associated with that same leg, then a determination must be made as to whether the last output Event Levels are also less than the Old Event Levels (STEP 923). If not, then the Filt-Cnt can be reset and the Old Event Levels updated with the New Event Levels, since the higher of the old and New Event Levels were previously output. However, if the last output Event Levels are less than the Old Event Levels, then the Old Event Levels must be output (STEP 925) to prevent the higher Event Levels from being overwritten without being output. Once the Old Event Levels have been output, then the Old Event Levels can be updated with the New Event Levels (STEP 921).

It can be seen from the above description of the second stage of the filter that when the Event Levels are increasing in value, a delay is imposed on the output of those Event Levels in order to prevent the Event Levels from changing, too rapidly. However, when the Event Levels are decreasing, the delay is dismissed and the Event Levels are output immediately to ensure that the higher Event Levels are not lost.

While the preferred embodiment of the present invention includes the two stage filter described above in an alternative embodiment, the present invention may have a single stage filter, a filter having more than two stages, or no filter at all.

Sectionalizer Process

Figure 6A:
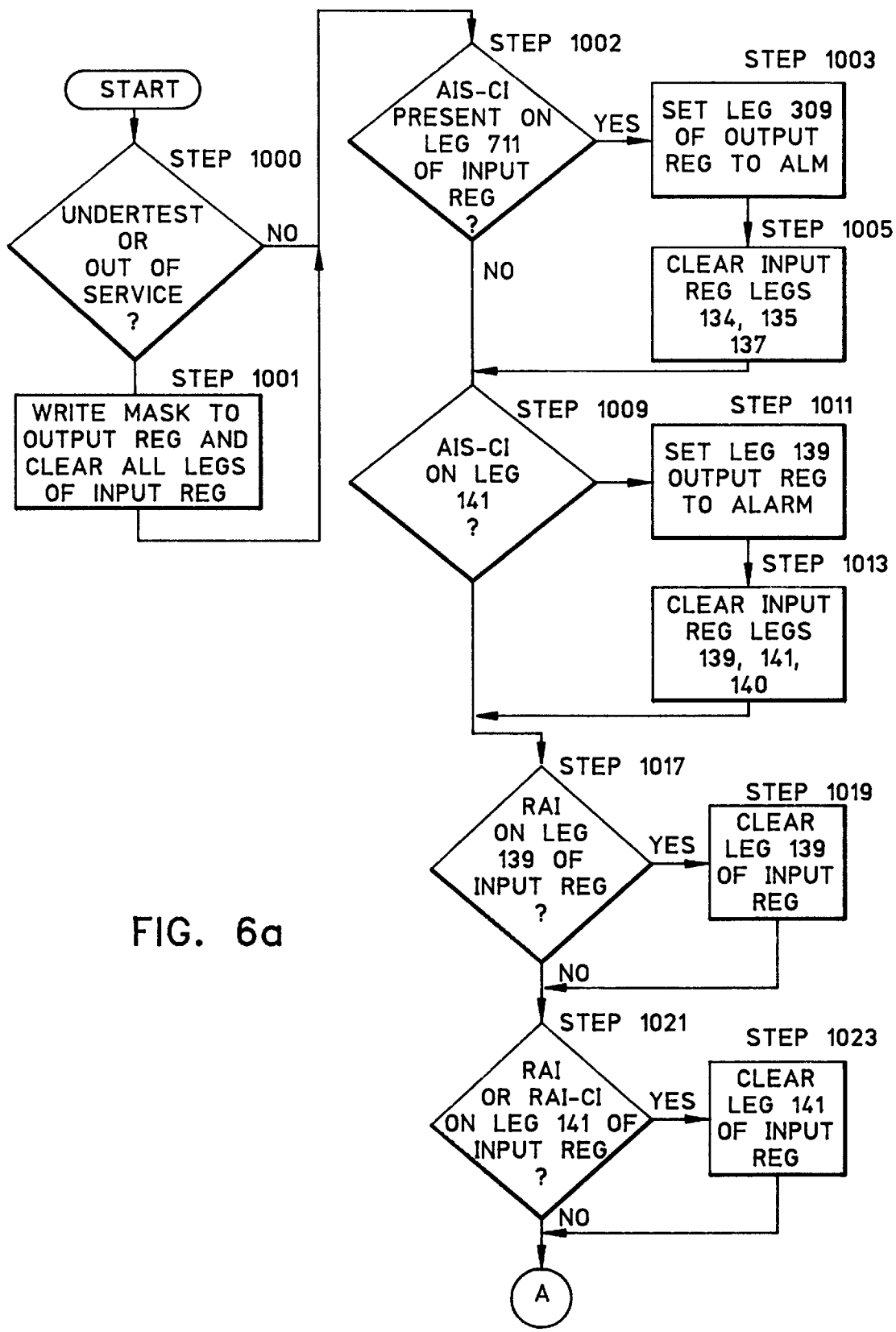
FIG. 6a–6c illustrate a flowchart of the Sectionalizer Process in accordance with one embodiment of the present invention.
Figure 6B:
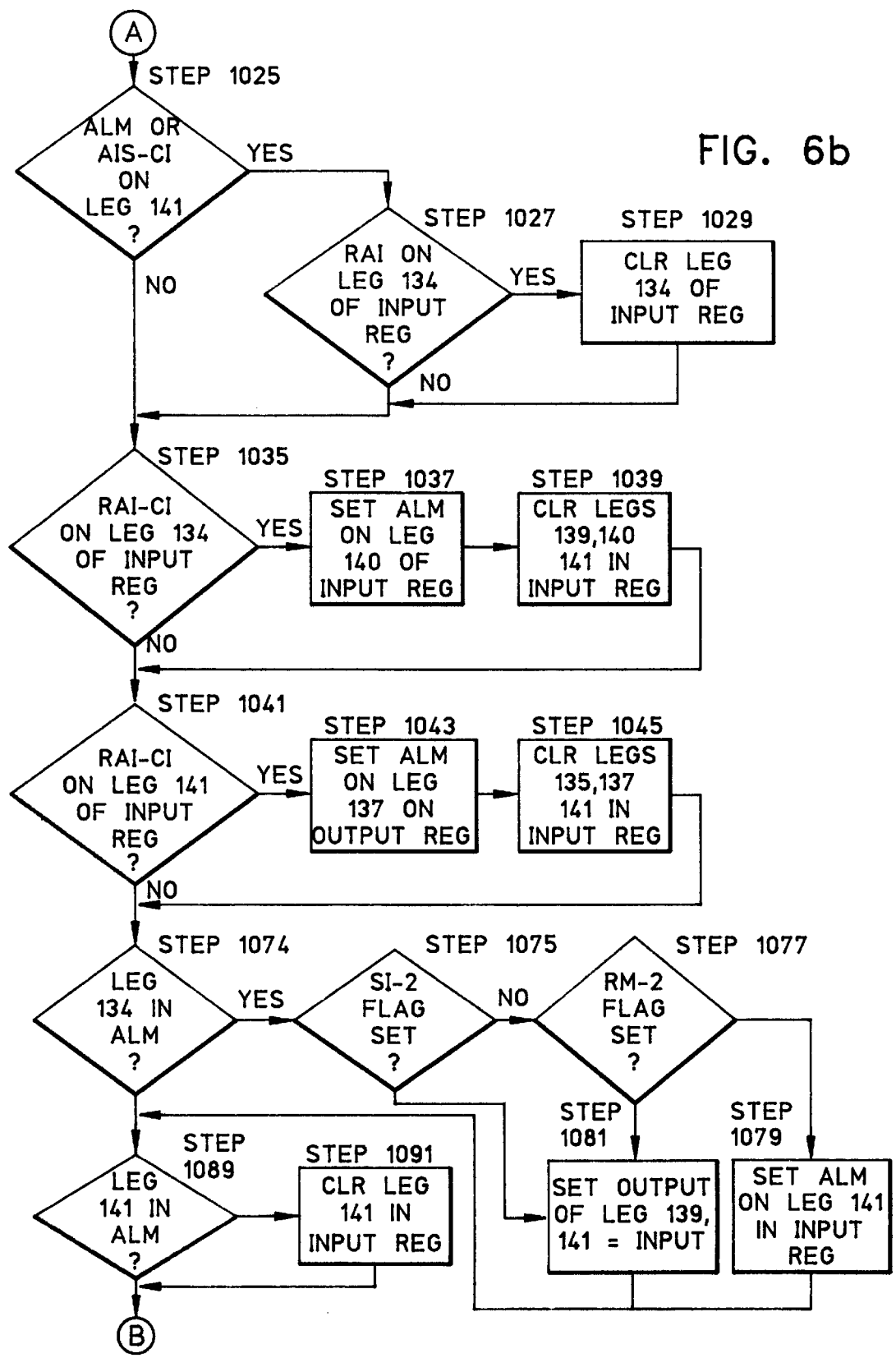
Figure 6C:
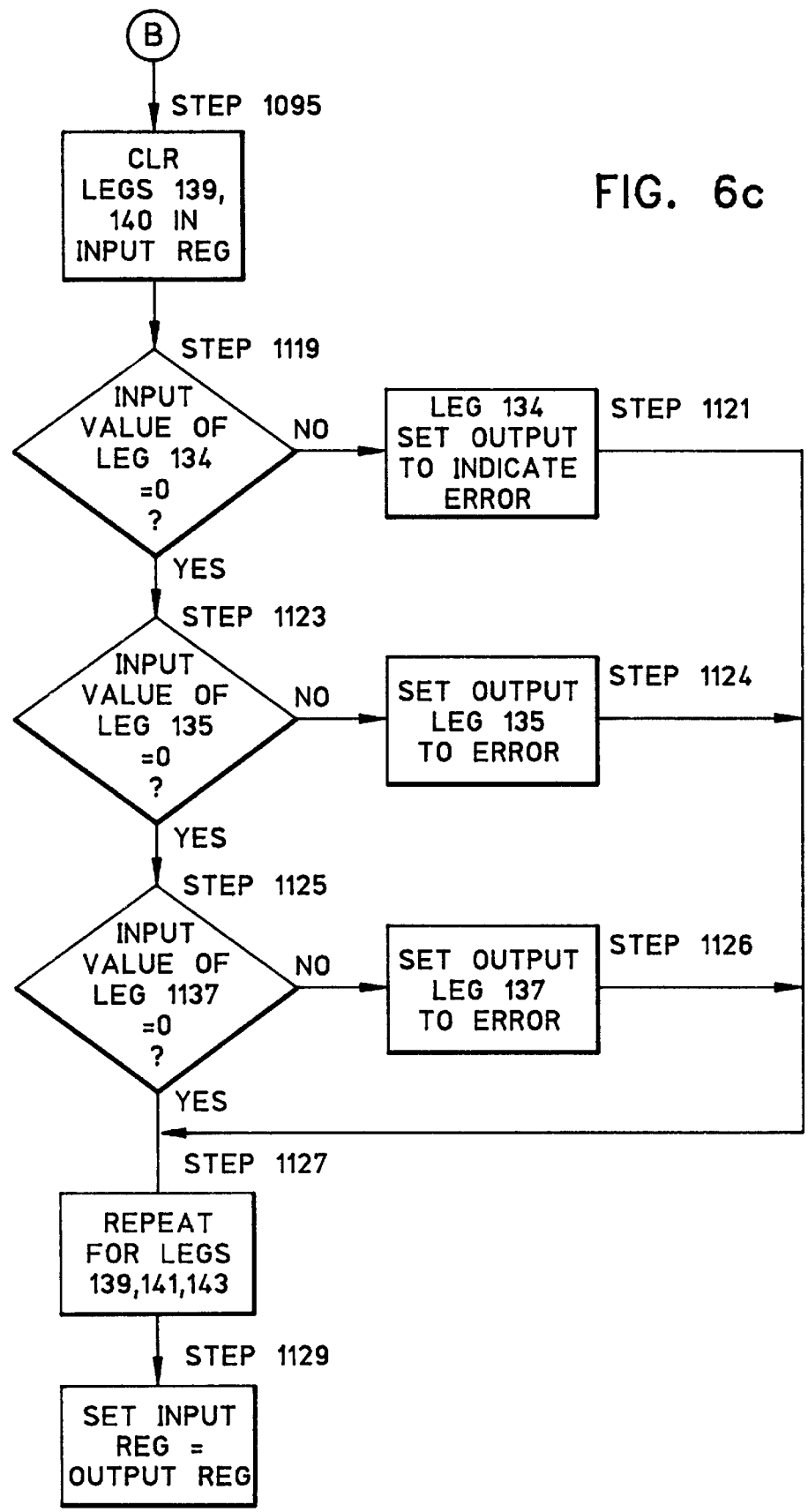

After the Event Levels have been filtered, each Mask is preferably sectionalized by the following Sectionalizer Process. It should be understood that the particular process that is disclosed herein is merely one example of the many ways in which the information that is collected within the Remote Module 100 may be used to determine the origin of alarms and errors. FIGS. 6a–6c illustrate a flowchart of the Sectionalizer Process in accordance with one embodiment of the present invention. In accordance with one embodiment of the present invention, the Mask to be operated upon is written to an input register. The output from the process is a Mask that is written to an output register.

In accordance with the process shown in the flowchart of FIGS. 6a–6c, the input register into which the Mask associated with a DS1 channel to be sectionalized is written can be read from, and written into. The present invention preferably results in a Mask being written to an output register. The value of the Mask indicates the leg in which an Event originated, and the type of Event which originated in that leg. For example, if a loss of signal occurred in the circuit due to a failure of a component within leg 136, the input register would indicated the presence of an RAI signal at leg 138. The output register would indicate an alarm condition at leg 136 to indicate that the RAI signal received on leg 138 by the Remote Module 100 was caused by an alarm condition on leg 136. The following is a detailed description of the process shown in the flowcharts of FIGS. 6a–6c.

Initially, in accordance with one embodiment of the present invention, the values returned from the filter are checked to determine whether the data path is either out of service or under test (STEP 1000). If the data path is either under test or out of service, then the value of the Mask is written to the output register and the input registers are all set to zero (STEP (1001). As will be seen, setting the input register to all zero causes the process to fall through to the end. Next, the input register is checked to determine whether that portion of the input register associated with leg 134 (hereafter known as "the input value of leg 134 ") is equal to Event Level "7" indicating that an alarm condition is present on leg 134 or an AIS signal has been received by the Remote Module 100 on leg 134 (STEP 1002). Since the Remote Module 100 is preferably placed at the point of demarcation between the CPE 104 and the LEC equipment, an alarm condition on leg 134 must have been generated by equipment that is the responsibility of the customer who owns the CPE 104.

Next, the input values of legs 134, 135, and 137 are cleared (STEP 1005), since any Event which is reported on these legs would be subordinate to (i.e., due to the same condition as) the alarm that is generated at leg 134.

If an AIS-CI signal is received by the Remote Module 100 on leg 141 from the far side Remote Module 101 (STEP 1009), then the output value of leg 139 is set to "5", indicating an alarm is present at leg 139 (STEP 1011) and the input values of legs 139, 141, and 140 are cleared (STEP 1013).

A further determination is made as to whether RAI was present on leg 139 as indicated by the input value of leg 139 being equal to "4" (STEP 1017). If the inquiry of STEP 1017 is positive, then the input value of leg 139 is cleared (STEP 1019). Likewise, a determination is made as to whether either RAI or RAI-CL are present on leg 141 (STEP 1021). If the answer to STEP 1021 is positive, then the input value of leg 141 is cleared (STEP 1023). Any RAI signal on legs 139 and 141 would be a result of a condition already detected at leg 134. Accordingly, since neither of these legs is the origin of the Event, the RAI signals can be cleared.

Next, a determination is made as to whether an alarm condition or AIS signal is detected on leg 141 (STEP 1025). If so, then a further determination is made as to whether RAI was present on leg 134 as indicated by the input value of leg 134 being equal to "4" (STEP 1027). If so, then the input value of leg 134 is cleared (STEP 1029).

Next, a determination is made as to whether RAI-CI is present on leg 134, as indicated by the input value of leg 134 (STEP 1035). If the answer to the inquiry of STEP 1035 is positive, then the source of the Event is an alarm condition on leg 140. Therefore, the output value of leg 140 will be set to an Event Level of "5" indicating an alarm condition on leg 140 (STEP 1037). The input values of legs 139, 140, and 141 are then cleared (STEP 1039), because the RAI or RAI-CI indicates on whether the Event occurred on leg 140 or legs 141 and 139. Furthermore, the earlier determination as to whether AIS or AIS-CL was received on leg 141 indicates whether the Event occurred on leg 139 or 141. It should be noted that the RAI or RAI-CI signal prevent PRMs from being reported, so there is no visibility on leg 134 when RAI or RAI-CI is present.

A determination is then made as to whether RAI-CI is present on leg 141, as indicated by the value of the Mask stored in the input register (STEP 1041). If the answer to the inquiry of STEP 1041 is positive, then the source of the Event is an alarm condition on leg 137. Therefore, that portion of the output register which is associated with leg 137 will be set to an Event Level of "5" indicating an alarm condition on leg 137 (STEP 1043). Those portions of the input register associated with legs 135, 137, and 141 can be cleared (STEP 1045).

If the input value of leg 134 is set to Event Level "4" (STEP 1074) and the SI-2 flag is not set (i.e., the Remote Module 100 is not still trying to determine whether the signal received on leg 141 is RAI or RAI-CI, or AIS or AIS-CI) (STEP 1075) and the RM-2 flag is set (indicating that there is a far end Remote Module 101 ) (STEP 1077), then the output value of leg 141 is set to Event Level "5" (STEP 1079) indicating that the origin of the Event is an alarm condition on leg 141.

Otherwise, if the answer to the inquiry of STEP 1077 is negative, then a determination can not be made as to whether the Event originated at leg 141 or 139. Accordingly, the output values of legs 139 and 141 are set to the input values of 139 and 141, respectively (STEPS 1081).

If the inquiry of STEP 1075 is answered in the positive (the ITAU has not yet been able to determine whether the signal being received is an AIS or an AIS-CI), then once again a determination can not be made as to whether the Event originated at leg 141 or 139. Accordingly, the output values of legs 139 and 141 are set to the input values of legs 139 and 141 (STEPS 1081).

Next, if input value of leg 141 indicates that leg 141 is in alarm condition (STEP 1089), then the input value of leg 140 is cleared (STEPS 1091), since the cause of the alarms in leg 140 is the alarm condition present on leg 141. Regardless of whether the answer to the inquiry in STEP 1089 is positive or negative, the input values of legs 139 and 140 are cleared (STEPS 1095), since the origin of these alarms has already been determined.

It should be noted that while the present invention functions without an improved network interface unit, such as the Remote Module at the far end of the circuit, the ability to determine the exact origin of an Event is limited in some cases, such as the case in which an RAI is present on the signal received by the Remote Module 100 on leg 141. The fact that the signals RAI-CI and AIS-CI may take longer to detect then RAI and AIS signals, can slow down the process. Therefore, in the preferred embodiment, the process suffers the ambiguity that is present when the Remote Module is not present if the RAI-CI or AIS-CI signal are not detected by the time they are needed by the process (as indicated by the fact that the SI-1 or SI-2 flag is set).

Next the input value of each leg is checked to determine whether an errored second has occurred in each leg. First the input value of leg 134 is checked (STEP 1119). If not equal to zero, then the output value of leg 134 is set to an Event Level which is indicative of the presence of an errored second on leg 134 (STEP 1121). If the input value of leg 134 is not set, then the input value of leg 135 is checked (STEP 1123). It should be noted that if there is no Remote Module 101 at the far end, then the number of error on leg 135 cannot be distinguished from the number of errors on leg 137. Furthermore, if the far end CSU 124 is not venerating PRMs then no information is available regarding the number of errors which occurred on legs 135 and 317. If the input value of leg 135 is not zero, then set the output value to an Event Level which is indicative of the presence of an errored second on leg 135 (STEP 1124). If the input value of leg 135 is not set, then the input value of leg 137 is checked (STEP 1125). In each case, if the input value is set (i.e., not equal to zero, indicative of the fact that an Event is present), then the output value corresponding to the input value is set to "1" to indicate the presence of an errored second (STEP 1126). The same process is followed with regard to legs 139, 141 and 140 (STEP 1127).

Finally, to conclude the process, the entire input register is set equal to the entire output register (STEP 1129). In accordance with one embodiment of the present invention, the mask that is output is compared with the last recorded output, and if different is stored in the Remote Module 100. Since the Mask is only stored if it differs, the amount of data that is stored is reduced.

It will be understood by those skilled in the art that the particular order in which the process is performed is not essential to the present invention. However, certain benefits are gained by processing first the Event Levels that clearly indicate a particular origin for an Event, such as the RAI-CI and AIS-CI Event Levels. Furthermore, in some cases, altering the order may cause ambiguity as to the source of an Event. For example, if RAI is processed before RAI-CI, then RAI-CI must be checked to determine whether the RAI-CI is the cause of the RAI. Nonetheless, a simple check to see if RAI-CI is present would be sufficient in this case to dismiss the ambiguity (assuming that an improved network interface module, such as a Remote Module, is present). If no Remote Module is present, then the ambiguity will exist regardless of the order in which the Events are processed.

A number of embodiments of the present invention have been described. Nevertheless, it will be understood that various modifications may be made without departing from the spirit and scope of the invention. For example, any method for communicating the sectionalized data that is collected at the network interface can be used. In addition, the in accordance with the present invention, any method may be used for determining the particular leg in which an error or alarm has occurred. Furthermore, while the present description primarily discusses DS1 circuits, the present invention is equally applicable to DS3circuits, and other such telecommunications protocols. Still further, any data that is collected at the network interface can be transmitted by encoding the information in the FBE, in the payload, or in the ESF DL. Furthermore, while the present invention is disclosed as having the ability to select one of many methods for transmitting the information from the network interface, a network device that has only one means available for transmitting information from the network interface would be within the scope of the present invention. Accordingly, it is to be understood that the invention is not to be limited by the specific illustrated embodiments, but only by the scope of the appended claims.

What is claimed is:

1. A method for storing, and making available for retrieval, performance monitoring information within a network interface unit on a telecommunications circuit divided into 4 legs, each leg associated with a direction of information signal flow, the method including the steps of:

(a) detecting at a network interface, errors on the telecommunications circuit;

(b) detecting at the network interface, alarms on the telecommunications circuit;

(c) determining during real-time operation of the telecommunications circuit, based upon signals received at the network interface, the leg of the telecommunications circuit in which originated an Event comprising a detected error or alarm; and (d) transmitting an indication, during real-time operation of the telecommunications circuit in response to a request, the circuit leg in which it was determined the Event originated.

2. A network interface unit that stores, and makes available for retrieval, performance monitoring information of a telecommunications circuit divided into 4 legs, where each leg is associated with a direction of information signal flow between a first end and a second end, external to the network interface unit, wherein the network interface unit includes:

(a) error detecting means for determining information relating to errors on the telecommunications circuit at a network interface;

(b) alarm detecting means for determining information relating to alarms on the telecommunications circuit at the network interface;

(c) determination means for determining, during real-time operation of the telecommunications circuit, based upon signals received at the network interface, the leg of the telecommunications circuit in which originated an Event comprising a detected error or alarm; and (d) transmission means for transmitting an indication, during real-time operation of the telecommunications circuit in response to a request, the circuit leg in which it was determined the Event originated.

3. A method as recited in claim 1, further including the step of:

(a) associating a time stamp that determines the elapsed time between the occurrence of the Event and the transmission of the circuit leg indication.

4. A network interface unit as recited in claim 2, further including:

(a) timing means for associating a time stamp that determines the elapsed time between the occurrence of the Event and the transmission of the circuit leg indication.

5. A method for storing within a network element, and transmitting from the network element, performance monitoring information as to where events originate within a telecommunications circuit, the telecommunications circuit having at least a first leg coupled between the network element and a first end of the circuit, such that signals are transmitted along the first leg from the first end of the circuit to the network element, a second leg coupled between the network element and a second end of the circuit, such that signals are transmitted along the second leg from the network element to the second end of the circuit, a third leg coupled between the second end of the circuit and the network element, such that signals are transmitted along the third leg from the second end of the network to the network element, and a fourth leg of the circuit coupled between the network element and the first end of the circuit, such that signals are transmitted along the fourth leg from the network element to the first end of the circuit, the method including the steps of:

a. determining in which leg of the circuit an event has occurred;

b. associating the event with an indication as to when the event has occurred;

c. storing an indication of the leg in which the event occurred and the indication as to when the event occurred; and d. in response to a request, transmitting the indication of the leg in which the event occurred and the indication as to when the event occurred.

6. A method as defined in claim 5, wherein the network element is located at the network interface.

7. A method as defined in claim 5, wherein the determination as to which leg of the circuit an event occurred within is based upon analysis of signals received by the network element over the first and third leg.

8. A method as defined in claim 5, wherein the step of determining in which leg of the circuit an event occurred includes the step of filtering received indications.

9. A method as defined in claim 8, wherein the step of filtering performs an automatic time correlation function.

10. A method as defined in claim 5, wherein the step of determining in which leg of the circuit an event occurred includes the steps of:

a. applying a first stage filter; and b. applying a second stage filter.

11. A method as defined in claim 5, wherein the step of determining in which leg of the circuit an event occurred includes the steps of:

a. assigning an event level to particular types of events; and b. processing indications of each event in an order that is determined based upon the event level of the indicated event.

12. A method for storing within a network element, and transmitting from the network element, performance monitoring information as to where events originate within a telecommunications circuit, the telecommunications circuit having at least a first leg coupled between the network element and a first end of the circuit, such that signals are transmitted along the first leg from the first end of the circuit to the network element, a second leg coupled between the network element and a second end of the circuit, such that signals are transmitted along the second leg from the network element to the second end of the circuit, a third leg coupled between the second end of the circuit and the network element, such that signals are transmitted along the third leg from the second end of the network to the network element, and a fourth leg of the circuit coupled between the network element and the first end of the circuit, such that signals are transmitted along the fourth leg from the network element to the first end of the circuit, the method including the steps of:

a. determining in which leg of the circuit an event has occurred;

b. determining an event type for the event that occurred;

c. associating the event with an indication as to when the event has occurred;

d. storing an indication of the leg in which the event occurred and the indication as to when the event occurred; and e. in response to a request, transmitting the indication of the leg in which the event occurred, the type of event which occurred, and the indication as to when the event occurred.

13. A method for storing within a network element, and transmitting from the network element, performance information as to where events originate within a telecommunications circuit, the circuit having at least a first leg coupled between the network element and a first end of the circuit, such that signals are transmitted along the first leg from the first end of the circuit to the network element, a second leg coupled between the network element and a second end of the circuit, such that signals are transmitted along the second leg from the network element to the second end of the circuit, a third leg coupled between the second end of the circuit and the network element, such that signals are transmitted along the third leg from the second end of the network to the network element, and a fourth leg of the circuit coupled between the network element and the first end of the circuit, such that signals are transmitted along the fourth leg from the network element to the first end of the circuit, the method including the steps of:

a. determining in which leg of the circuit an event has occurred based upon signals received by the network element over the first and third legs;

b. generating a first indication that indicates in which leg the event occurred;

c. associating the first indication with a time stamp indicating when the event has occurred;

d. storing the time stamp and the first indication;

e. transmitting the first indication in response to receipt of a request;

f. determining when the first indication is to be transmitted relative to the time stamp;

g. generating a second indication indicating when the event occurred with respect to the time the first indication is to be transmitted; and h. transmitting the second indication with the first indication.

14. A method as defined in claim 13, wherein the second indication has a first resolution if transmitted more than a first predetermined amount of time after the event associated with the first indication has occurred, and wherein the second indication has a second resolution that is coarser than the first resolution if transmitted more than a second predetermined amount of time after the event associated with the first indication has occurred.

15. A method as defined in claim 14, wherein the first and second predetermined times are approximately equal.

* * * * *

UNITED STATES PATENT AND TRADEMARK OFFICE
CERTIFICATE OF CORRECTION

PATENT NO. : 6,091,712 Page 1 of 1
DATED : July 18, 2000
INVENTOR(S) : Pope et al.

It is certified that error appears in the above-identified patent and that said Letters Patent is hereby corrected as shown below:

<u>Title page,</u>
Item [56], References Cited, please add the following in the FOREIGN PATENT DOCUMENTS:

-- EPO741471A1      11/6/96      EPO H04L 1/20 --

Item [56], References Cited, please add the following in the OTHER PUBLICATIONS:

-- J. G. Gruber, "Performance and Fault Management Functions for the Maintenance of SONET/SDH and ATM Transport Networks", 5/23/93, pp. 1308-1314.
J. S. Hartanto, "An In-Service, Non-Intrusive Monitoring Device (INMD) for Call Quality Performance Monitoring", 5/19/95, pp. 682-689.

Signed and Sealed this

Sixteenth Day of July, 2002

Attest:

JAMES E. ROGAN
Attesting Officer      *Director of the United States Patent and Trademark Office*